(12) United States Patent
Potta et al.

(10) Patent No.: US 12,543,104 B1
(45) Date of Patent: Feb. 3, 2026

(54) DYNAMIC BEACON DISCOVERY

(71) Applicant: Amazon Technologies, Inc., Seattle, WA (US)

(72) Inventors: Srikar Potta, San Diego, CA (US); Franklin Mathew Zhang, Irvine, CA (US); Shruti Makharia, Los Gatos, CA (US); Basak Oyman, Mountain View, CA (US); Uttam Bhat, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 18/474,809

(22) Filed: Sep. 26, 2023

(51) Int. Cl.
H04W 48/16 (2009.01)
H04W 24/04 (2009.01)
H04W 48/10 (2009.01)
H04W 56/00 (2009.01)

(52) U.S. Cl.
CPC .......... *H04W 48/16* (2013.01); *H04W 24/04* (2013.01); *H04W 48/10* (2013.01); *H04W 56/001* (2013.01)

(58) Field of Classification Search
CPC ..... H04W 48/16; H04W 48/10; H04W 24/04; H04W 56/001

USPC ......................................................... 370/216
See application file for complete search history.

(56) References Cited

FOREIGN PATENT DOCUMENTS

WO    WO-2011106538 A1 * 9/2011 ............ H04W 48/16

* cited by examiner

Primary Examiner — Intekhaab A Siddiquee
(74) Attorney, Agent, or Firm — Pierce Atwood LLP

(57) ABSTRACT

A system that improves beacon discovery by enabling a device to determine a dynamic threshold and connect to a gateway that satisfies the dynamic threshold. For example, the device may iteratively scan through available channels for a first duration of time, detecting beacon signals and storing corresponding signal strengths, then calculate a dynamic threshold value using the stored information. In some examples, the dynamic threshold value is calculated using a sum and counter implementation, with the counter incrementing with each beacon signal detected and a summing component adding the signal strength. Additionally or alternatively, the device may switch between performing first beacon discovery using a static threshold and performing second beacon discovery using a dynamic threshold. For example, the device may perform the first beacon discovery when movement of the device exceeds a threshold, while performing the second beacon discovery when movement of the device is below the threshold.

23 Claims, 17 Drawing Sheets

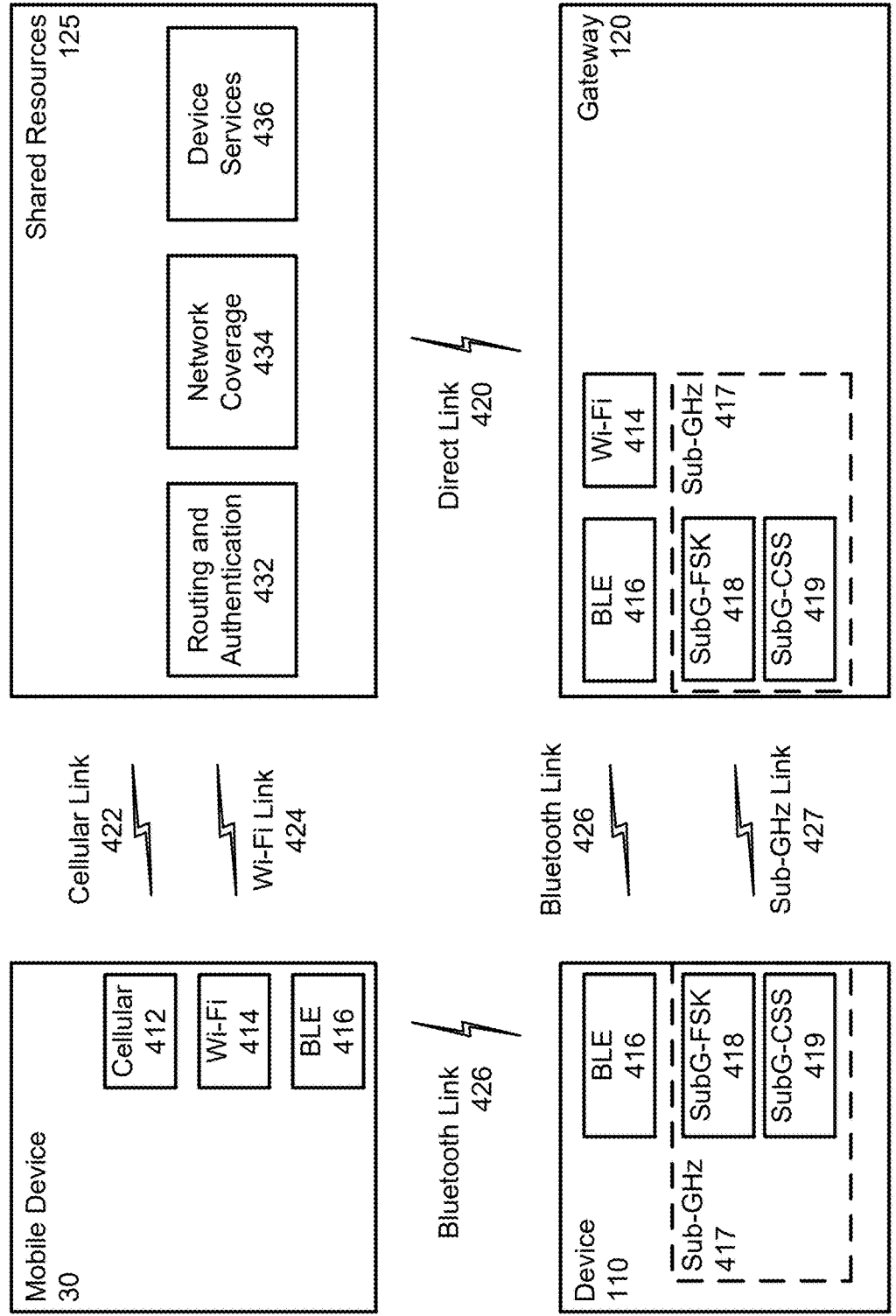

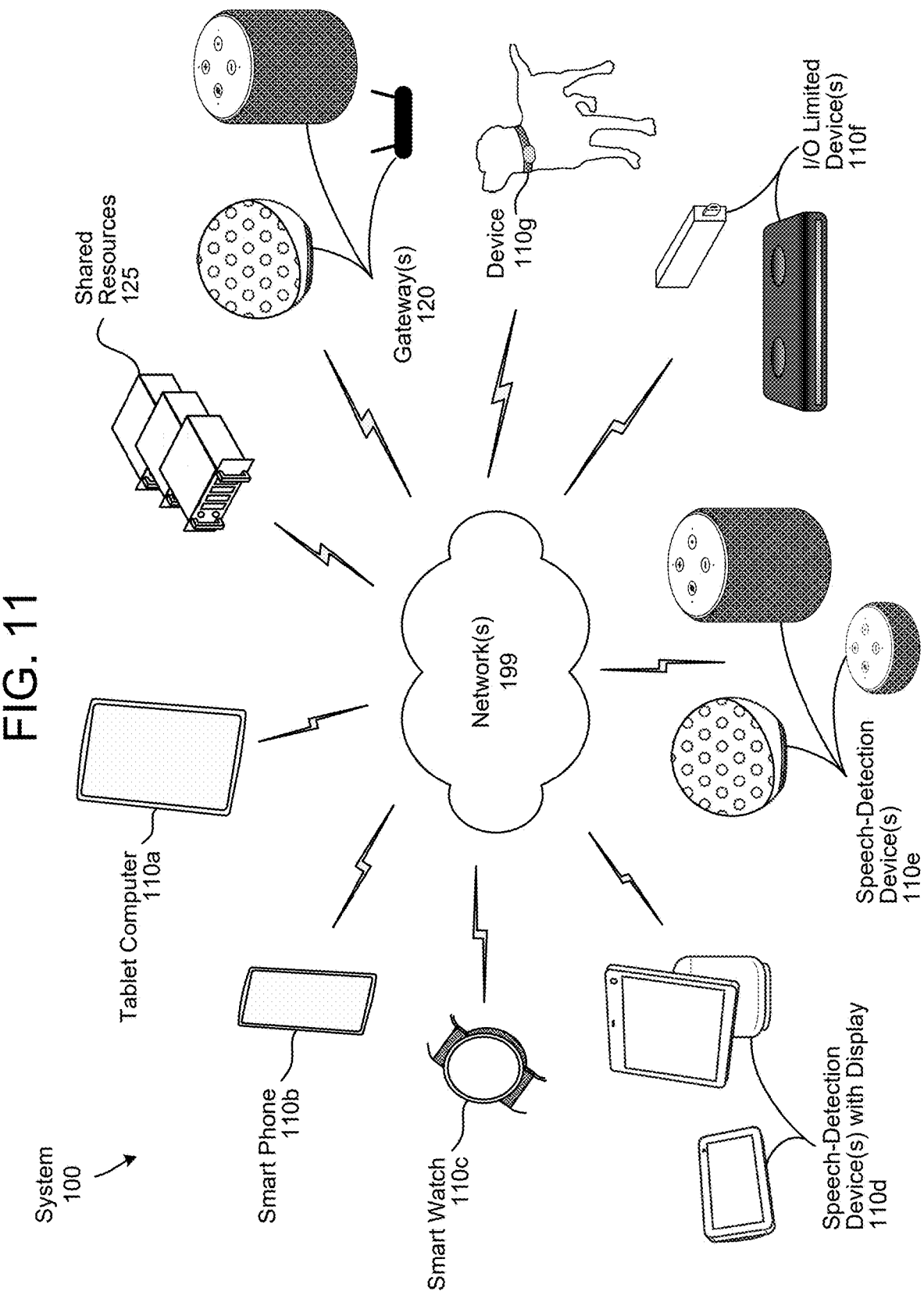

DYNAMIC BEACON DISCOVERY

BACKGROUND

With the advancement of technology, the use and popularity of electronic devices has increased considerably. Electronic devices are commonly used to wirelessly connect to networks using network devices such as access points or gateway components.

BRIEF DESCRIPTION OF DRAWINGS

For a more complete understanding of the present disclosure, reference is now made to the following description taken in conjunction with the accompanying drawings.

FIG. 4 is a component diagram illustrating example network architecture according to embodiments of the present disclosure.

FIG. 11 illustrates an example of a computer network for use with the overall system according to embodiments of the present disclosure.

DETAILED DESCRIPTION

Figure 1:
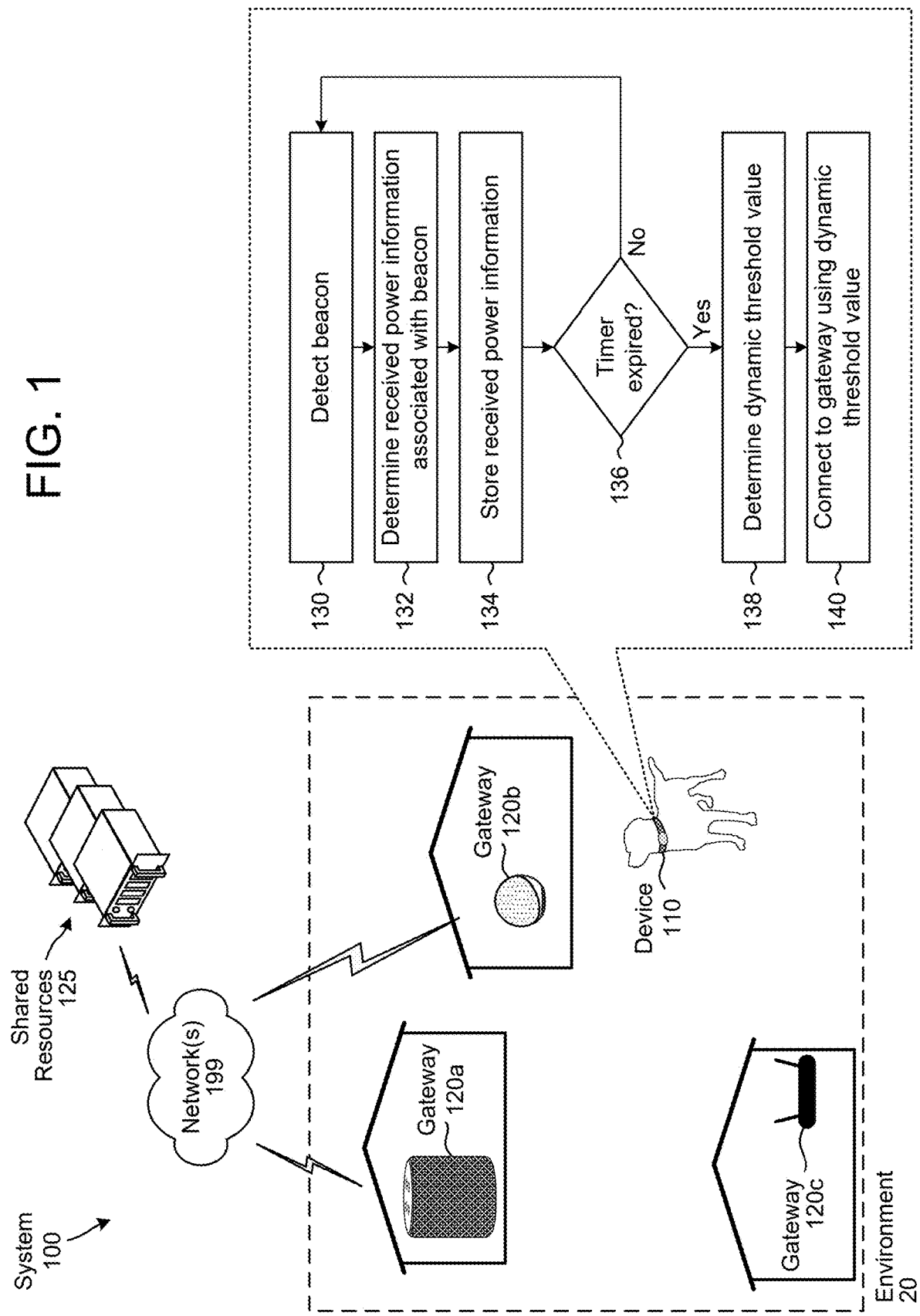
FIG. 1 illustrates a system for performing dynamic beacon discovery according to embodiments of the present disclosure.

Electronic devices are commonly used to connect to networks using network devices such as access points and/or gateway components. For example, a first device may connect to a first wireless network associated with an access point and may send and receive data via the first wireless network. Thus, the access point may enable the first device to communicate with other devices via one or more network(s), which may include private network(s), public network(s), local network(s), and/or wide network(s) such as the Internet. In addition, the first device may be configured as a gateway component, enabling a second device to communicate via the one or more network(s) using the first device as a gateway to other connectivity such as other devices, other network(s) (such as the Internet), etc. For example, the first device may broadcast beacon signals at specific intervals on a specific frequency (e.g., channel) and the beacon signals may provide synchronization to the one or more network(s).

If the second device is not connected to a gateway component, the second device may perform gateway discovery by scanning for beacon signals across multiple channels. Upon detecting a beacon signal from the first device, the second device may use the beacon signal to synchronize a timing with the first device. Once the timing is synchronized, the first device may route traffic (e.g., data) between the first device and the one or more network(s) (e.g., the Internet), with the first device acting as a passthrough node.

In one beacon discovery process, the second device scans for beacon signals across multiple channels and connects to the first beacon signal detected. Thus, the second device may iteratively scan each channel for a beacon signal until a beacon signal is found. For example, the second device may scan a first channel for a beacon signal, determine that a beacon signal is not detected within a duration of time, then move to a second channel and repeat this process across all of the channels in a frequency range (e.g., 69 channels) in an attempt to detect a beacon signal. Once the second device detects a beacon signal, the second device uses the beacon signal to synchronize its timing and frequency hopping generator with a corresponding gateway component.

As this beacon discovery process selects the first beacon signal detected, this technique prioritizes quicker discovery (e.g., shorter discovery time) over reliability and/or a data rate associated with the wireless link. For example, the second device may synchronize with a gateway component that is very far away and/or associated with a signal strength that is just above a sensitivity level required to successfully transmit/receive data packets. This may result in a quick connection, but may also result in a device connecting over a link that may not offer the best quality of service.

To improve a reliability of a wireless link, devices, systems and methods are disclosed that perform beacon discovery using a dynamic threshold value. In some examples, a device may determine a dynamic threshold and connect to a gateway component that satisfies the dynamic threshold. For example, the device may iteratively scan through available channels for a first duration of time, detecting beacon signals and storing signal strengths of the detected beacon signals, then calculate a dynamic threshold value using the stored information. In some examples, the dynamic threshold value is calculated using a sum and counter implementation, with the counter incrementing with each beacon signal detected while a corresponding signal strength is added to a summing component. Thus, the device may determine the dynamic threshold by dividing the sum by the counter value. Additionally or alternatively, the device may switch between performing first beacon discovery using a static threshold and performing second beacon discovery using a dynamic threshold. For example, the device may perform the first beacon discovery when movement of the device exceeds a threshold, while performing the second beacon discovery when movement of the device is below the threshold.

FIG. 1 illustrates a system for performing dynamic beacon discovery according to embodiments of the present disclosure. For example, a device 110 may be configured to perform dynamic beacon discovery to connect to one or more network(s) 199 via a gateway component 120. As illustrated in FIG. 1, the system 100 may include one or more gateway components 120 that may communicate with each other, one or more shared resources 125, and/or additional devices (not illustrated) via the network(s) 199. Although FIG. 1, and other figures/discussion illustrate the operation of the system in a particular order, the steps described may be performed in a different order (as well as certain steps removed or added) without departing from the intent of the disclosure.

In some examples, the shared resources 125 may be a group of computing components located geographically remote from device 110 but accessible via the network(s) 199 (e.g., servers accessible via the Internet). The disclosure is not limited thereto, however, and in other examples the shared resources 125 may also include system component(s) that are physically separate from device 110 but located geographically close to device 110 and accessible via the network 199 without departing from the disclosure.

As illustrated in FIG. 1, an environment 20 may include the device 110 and one or more gateway components 120. For example, FIG. 1 illustrates an example in which the environment includes a first gateway component 120a (e.g., first speech-detection device) associated with a first location, a second gateway component 120b (e.g., second speech-detection device) associated with a second location, and a third gateway component 120c (e.g., wireless access point) associated with a third location. However, the disclosure is not limited thereto, and the environment 20 may include additional gateway components 120 without departing from the disclosure. Additionally or alternatively, two or more gateway components 120 may be associated with a single location (e.g., building) and/or user profile without departing from the disclosure.

Each of the gateway components 120a-120c may be configured to enable the device 110 to connect to the network(s) 199. For example, the gateway components 120a-120c may broadcast a beacon signal at a periodic interval, and the beacon signal may enable one or more devices 110 to synchronize a timing with the gateway component 120 and/or connect to the network(s) 199 via the gateway component 120. As used herein, synchronizing timing information with the first gateway component 120a may correspond to establishing a connection with the first gateway component 120a, establishing a wireless link with the first gateway component 120a, the first gateway component 120a routing traffic to and from the network(s) 199, and/or the like, although the disclosure is not limited thereto.

The device 110 may be an electronic device capable of sending and/or receiving data via a radio frequency (RF) signal. For example, the device 110 illustrated in FIG. 1 corresponds to a pet tracking device that enables a user to locate and/or monitor a location of the pet, represented as a dog. However, the disclosure is not limited thereto, and the device 110 may correspond to other trackers (e.g., vehicle tracking device), sensors (e.g., security sensors, motion detectors, natural gas detectors, etc.), other devices, and/or the like without departing from the disclosure.

As illustrated in FIG. 1, the device 110 may detect (130) a beacon signal, may determine (132) received power information associated with the beacon signal, and may store (134) the received power information. The device 110 may determine (136) whether a timer has expired and, if not, may loop to step 130 to repeat steps 130-134 for an additional beacon signal. For example, the device 110 may scan a plurality of channels until the timer expires, detecting one or more beacon signals and storing corresponding received power information for each of the detected beacon signals.

To illustrate an example, the device 110 may detect a first beacon signal associated with the first gateway component 120a and determine a first received power value corresponding to the first beacon signal. Similarly, the device 110 may detect a second beacon signal associated with the second gateway component 120b and determine a second received power value corresponding to the second beacon signal, detect a third beacon signal associated with the third gateway component 120c and determine a third received power value corresponding to the third beacon signal, and so on for each of the gateway components 120 within range of the device 110.

If the device 110 determines that the timer has expired, the device 110 may determine (138) a dynamic threshold value and connect (140) to a gateway component 120 using the dynamic threshold value. For example, the device 110 may determine the dynamic threshold value by taking an average of the first received power value, the second received power value, and the third received power value. The disclosure is not limited thereto, however, and in other examples the device 110 may determine the dynamic threshold value using other operations without departing from the disclosure. For example, the device 110 may determine an n-th percentile, a median received power value, a weighted average, and/or the like without departing from the disclosure. Additionally or alternatively, the device 110 may store beacon information associated with one or more beacon signals and may directly connect to a gateway component 120 in step 140 without departing from the disclosure.

After determining the dynamic threshold value, in some examples the device 110 may connect to a gateway component 120 in step 140 by scanning through one or more channels to detect a beacon signal. If the detected beacon signal is associated with a received power value that exceeds the dynamic threshold value, the device 110 may synchronize timing information with the gateway component 120 corresponding to the detected beacon signal. However, if the received power value is below the dynamic threshold value, the device 110 may continue performing the beacon discovery process by scanning additional channels. By only connecting to beacon signals that satisfy the dynamic threshold value, a reliability of a wireless link between the device 110 and the gateway component 120 may be improved.

While FIG. 1 illustrates an example in which the device 110 determines received power information associated with the beacon signal, the disclosure is not limited thereto. Instead, the device 110 may determine a signal quality metric value, such as a signal-to-noise ratio (SNR) value, associated with the beacon signal without departing from the disclosure. Additionally or alternatively, the device 110 may determine a Received Signal Strength Indicator (RSSI) value, a Signal to Interference and Noise Ratio (SINR) value, a Cyclic Redundancy Check (CRC) value, and/or the like without departing from the disclosure. SNR can be characterized as a desired signal's received signal strength (RSS) relative to thermal noise of the receiving device as integrated by the signal bandwidth. Both the RSS and SNR can be predicted or determined at a receiving device without the need for explicit feedback from a transmitting device. For example, an RSSI value may be determined based on a voltage level from a baseband signal chain before a baseband amplifier. Output from an RSS circuit may be an analog direct current voltage level. This output can be sampled by an analog-to-digital converter (ADC) to determine RSSI values for a given time. A voltage value (in volts) sampled by an ADC may be converted to a power value for a given impedance Z, e.g. $P=V*V/Z$. However, in order to convert this into an RSSI value, it is generally desirable to have this power value expressed in decibels per milliwatt, e.g. P(dbm)=10*Log 10(1000*P). Accordingly, a voltage value (in volts) sampled by an ADC may be converted to an RSSI value (in decibels per milliwatt) using, e.g., a formula such as P(dbm)=10*Log 10(1000*V^2/Z).

While the example described above includes performing a second iteration of beacon discovery using the dynamic threshold value, such as scanning through the channels to detect a beacon signal that exceeds the dynamic threshold value, the disclosure is not limited thereto. As will be described in greater detail below with regard to FIG. 6C, in some examples the device 110 may store beacon information, such as a received power value and identifier associated with an individual beacon signal and/or gateway component 120, enabling the device 110 to connect to a gateway component 120 directly without performing the second iteration of beacon discovery. For example, the device 110 may use the beacon information to identify a best beacon signal having a highest signal quality metric value (e.g., measured using RSSI, SNR, SINR, CRC, and/or the like) and connect to a corresponding gateway component 120.

In some examples, the beacon information may include a frequency hopping seed, which may correspond to a value used in a channel hopping algorithm. For example, a channel on which an individual gateway component 120 broadcasts a beacon signal may vary over time based on the channel hopping algorithm. Thus, while the device 110 may detect a beacon signal associated with a first gateway component 120a on a first channel during a first time range, the device 110 may be unable to connect to the first gateway component 120a on the first channel during a second time range, as the first gateway component 120a is now broadcasting on a second channel. However, if the device 110 stores the frequency hopping seed associated with the first gateway component 120a as part of the beacon information, the device 110 may connect to the first gateway component 120a on the second channel during the second time range. For example, the device 110 may use the frequency hopping seed, the channel hopping algorithm, and timing information (e.g., timestamp) associated with the first time range to predict that the first gateway component 120a will be broadcasting on the second channel during the second time range.

Sub-gigahertz (sub-GHz) wireless protocols operate in frequency bands below 1 GHz. These sub-GHz wireless protocols are typically used for long-range and low-power applications that require efficient communication over large distances or through obstacles. Sub-GHz wireless protocols can achieve longer communication ranges compared to higher-frequency protocols. Lower frequency signals can travel further and penetrate obstacles more effectively, making sub-GHz protocols suitable for long-range connectivity applications. Due to their longer wavelengths, sub-GHz signals have better penetration capabilities through walls, buildings, and vegetation. This characteristic makes them ideal for applications, such as smart metering, agricultural monitoring, industrial automation, and other scenarios where signals need to reach distant locations or pass through obstacles. Sub-GHz wireless protocols typically offer lower data rates than higher frequency protocols such as the Wi-Fi® or Bluetooth® protocols. The trade-off for longer range and lower power consumption is a reduced capacity for high-bandwidth data transmission. However, sub-GHz wireless protocols are often well-suited for applications prioritizing low-rate intermittent data transfer or simple command and control operations.

As used herein, the device 110 may operate in the sub-GHz frequency band using one or more modulation schemes without departing from the disclosure. For example, the device 110 may communicate with the gateway component 120 using a first modulation scheme (e.g., frequency shift keying (FSK) modulation scheme), a second modulation scheme (e.g., Chirp Spread Spectrum (CSS) modulation scheme, such as LoRa (Long Range)), and/or a third modulation scheme (e.g., Orthogonal Frequency Division Multiplexing (OFDM) modulation scheme), although the disclosure is not limited thereto.

In some examples, the device 110 may receive a radio frequency (RF) signal that includes an incoming packet (e.g., data packet) with a preamble, a header, and/or a payload. For example, a physical layer frame may start with a preamble and the device 110 may use the preamble to detect and synchronize to the incoming data packet. In addition, the header may provide details of the packet length and encoding parameters, like Coding Rate, Error Correcting Code, or the like. Further, the header may be followed by the payload, which encodes the packet data. In some examples, the data packet may include a physical layer frame, a media access control (MAC) layer frame, and/or an application layer frame, although the disclosure is not limited thereto.

As will be described in greater detail below, the device 110 may demodulate the preamble using one or more modulation schemes without departing from the disclosure. However, in some examples the preamble can be decoded using one of the modulation schemes. Thus, the device 110 may associate the RF signal with the modulation scheme that successfully decodes the preamble, such that the device 110 demodulates the payload using the successful modulation scheme.

As used herein, a frequency band corresponds to a frequency range having a starting frequency and an ending frequency. Thus, the total frequency range may be divided into a number of frequency ranges, with each frequency range referred to as a frequency band. However, the disclosure is not limited thereto and a number of frequency bands, a size of the frequency bands, and/or the like may vary without departing from the disclosure.

Figure 2A:
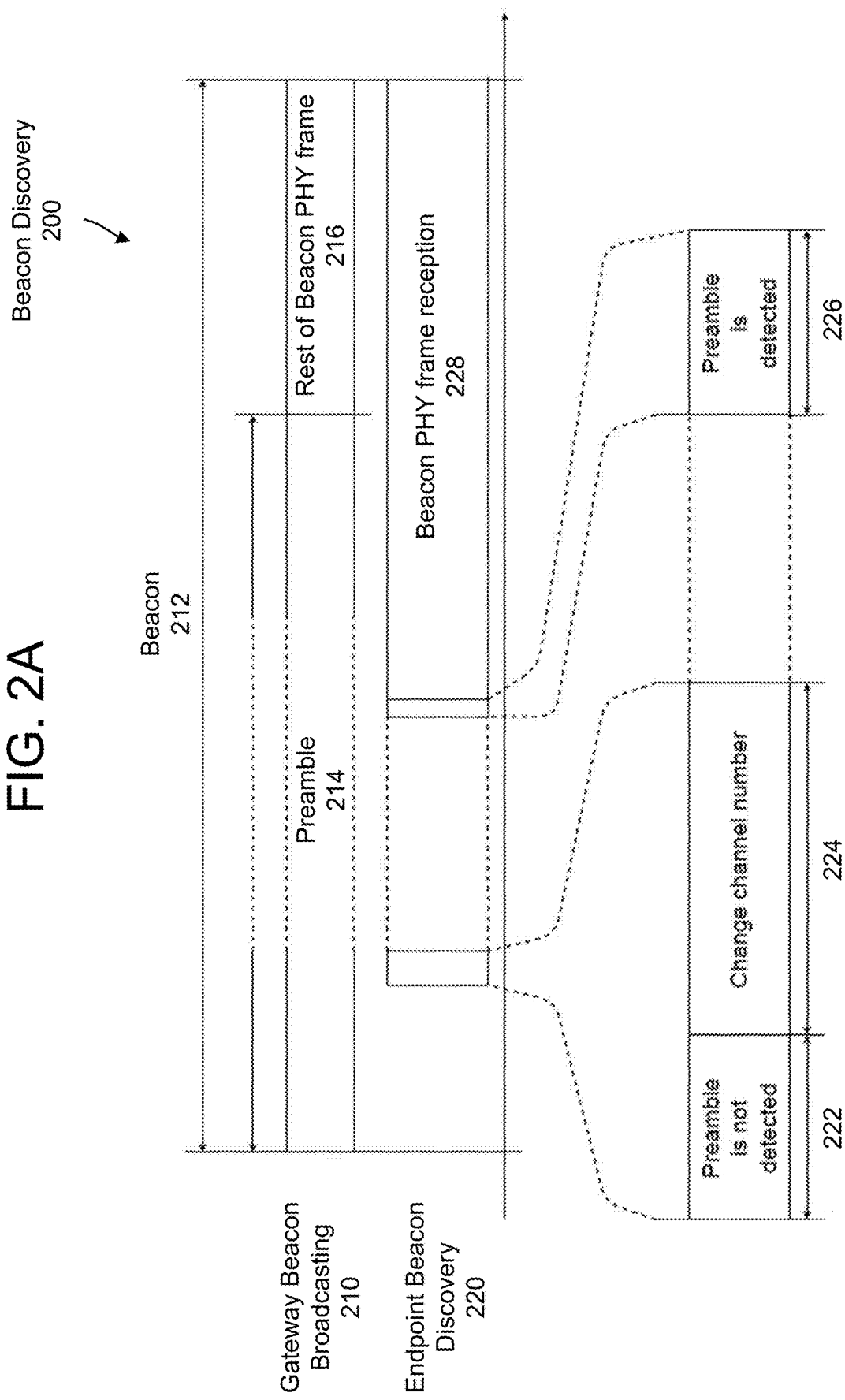
FIGS. 2A-2B illustrate examples of performing beacon discovery.
Figure 2B:
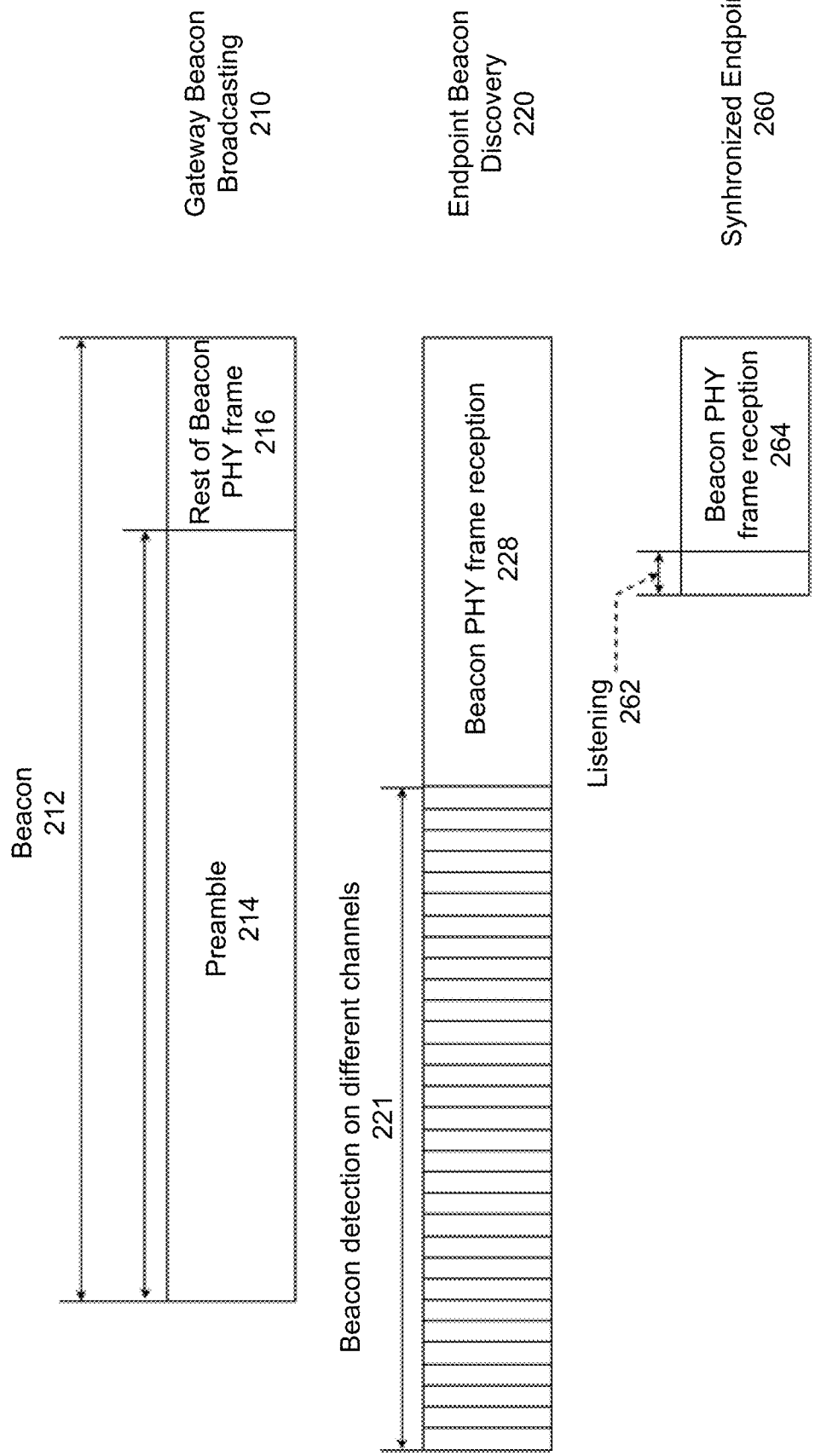

FIGS. 2A-2B illustrate examples of performing beacon discovery. As illustrated in FIG. 2A, performing beacon discovery 200 involves a combination of the gateway component broadcasting a beacon signal (e.g., gateway beacon broadcasting 210) and the device 110 performing beacon discovery (e.g., endpoint beacon discovery 220). For example, the gateway beacon broadcasting 210 may correspond to a gateway component 120 sending a beacon signal 212 (e.g., beacon) at a fixed interval. As illustrated in FIG. 2A, the beacon signal 212 may include a first segment (e.g., preamble 214) followed by a second segment (e.g., rest of Beacon physical (PHY) frame 216). For example, the second segment may correspond to a header, a payload, and/or the like, although the disclosure is not limited thereto. The gateway component 120 may continue to broadcast the beacon signal 212 at the fixed interval (e.g., every n seconds).

In some examples, a radio frequency (RF) frame may be a physical (PHY) frame that includes a physical header attached to a predefined preamble. For example, the RF frame may include five segments: a preamble, a sync word, a PHY header, a PHY payload, and a Frame Check Sequence (FCS). As used herein, the preamble may be included for bit synchronization and may be repeated for improving receiver synchronization and probability of reception (e.g., due to time drift, multipath effect, etc.), the sync word may mark a beginning of a data block, the PHY header may contain PHY data control bits, the PHY payload may correspond to a link layer frame, and the FCS may correspond to a data block checksum.

The content and length of each segment depends on a predefined modulation scheme, such as a first modulation scheme (e.g., frequency shift keying (FSK) modulation scheme), a second modulation scheme (e.g., Chirp Spread Spectrum (CSS) modulation scheme, such as LoRa (Long Range)), and/or a third modulation scheme (e.g., Orthogonal Frequency Division Multiplexing (OFDM) modulation scheme). In order to properly receive the RF frame (e.g., RF data), the receiver must synchronize its demodulator with the preamble signal, demodulate and decode the PHY header to gather information regarding receiving the RF frame, and then receive the payload (e.g., link layer frame, link layer data content, etc.). A correctness of transmission may be confirmed by calculating the FCS at the end. After FCS evaluation, device 110 may pass the link layer data content for further processing or discard the link layer data content.

Separately, the device 110 may perform endpoint beacon discovery 220 to detect a beacon signal across a plurality of channels (e.g., 69 channels). As illustrated in FIG. 2A, the device 110 may iteratively scan the channels to try to detect and decode the preamble 214. For example, if the preamble is not detected 222 using a first channel, the device 110 may change a channel number 224 and check for the preamble 214 using a second channel. The device 110 may scan for the preamble 214 on each channel for a first duration of time before determining that the preamble 214 is not detected 222 and changing the channel number 224. As illustrated in FIG. 2A, the device 110 may iteratively change the channel number until a preamble is detected 226, at which point the device 110 may perform beacon PHY frame reception 228. For example, after the device 110 determines that the preamble is detected 226, the device 110 may attempt to receive and decode a data packet corresponding to the preamble 214. As the decoded data packet corresponds to the beacon signal 212, it will obtain timing and frequency hopping information that may enable the device 110 to synchronize its timing and frequency hopping generator with the gateway component 120.

FIG. 2B illustrates an example of beacon discovery 250, which expands on the endpoint beacon discovery 220 illustrated in FIG. 2A and illustrates an example of a synchronized endpoint 260 that is already synchronized with the gateway component 120. As illustrated in FIG. 2B, the endpoint beacon discovery 220 includes performing beacon detection for a plurality of different channels (e.g., beacon detection on different channels 221) prior to the beacon PHY frame reception 228. Thus, during endpoint beacon discovery 220 the device 110 may switch between the plurality of channels until the preamble 214 is detected, at which point the device 110 may continue receiving the beacon signal 212 until an end of the second segment (e.g., rest of beacon PHY frame 216).

In contrast, the synchronized endpoint 260 is synchronized to a timing of the gateway component 120 and may be configured to listen near an end of the preamble 214. For example, after performing endpoint beacon discovery 220 and becoming synchronized with the gateway component 120, the device 110 may begin listening 262 based on the fixed interval, which coincides with a portion of the preamble 214 just before the payload. The device 110 may then continue receiving the beacon signal 212 and may perform beacon PHY frame reception 264 to receive the second segment (e.g., rest of beacon PHY frame 216) of the beacon signal 212. However, the disclosure is not limited thereto and in some examples the synchronized endpoint 260 may begin listening 262 at the beginning of the preamble 214 without departing from the disclosure.

In some examples, the beacon signal 212 may include a frequency hopping seed, which may correspond to a value used in a channel hopping algorithm. For example, a channel on which an individual gateway component 120 broadcasts a beacon signal may vary over time based on the channel hopping algorithm. Thus, the synchronized endpoint 260 may use the frequency hopping seed to identify the channel on which the gateway component 120 will broadcast at a given time, enabling the synchronized endpoint 260 to receive the beacon signal 212 even as the gateway component 120 changes channels. For example, the device 110 may use the frequency hopping seed, the channel hopping algorithm, and timing information to predict that the gateway component 120 will be broadcasting on a particular channel during a particular time range.

Once the device 110 successfully decodes the beacon signal 212, the device 110 may be synchronized with a first gateway component 120a and may ignore data packets received from other gateway components 120. As long as the device 110 continues to receive the beacon signal 212 from the first gateway component 120a, the device 110 may maintain synchronization with the first gateway component 120a. However, once a first number of consecutive beacon signals (e.g., 3 consecutive beacons, although the disclosure is not limited thereto) are lost (e.g., not detected by the device 110), the device 110 may begin beacon discovery and scan a plurality of channels to detect another beacon signal and synchronize with another gateway component 120. In some examples, the system 100 may determine a first duration of time corresponding to the first number of consecutive beacon signals, and the device 110 may determine that the first number of consecutive beacon signals are not detected if the first duration of time has elapsed since receiving the most recently detected beacon signal 212. For example, if the gateway component 120 sends the beacon signal 212 every n seconds (e.g., every 10 seconds), the first duration of time may correspond to 3n seconds (e.g., 30 seconds), such that the device 110 begins beacon discovery after not receiving the beacon signal 212 for 30 seconds.

Figure 3:
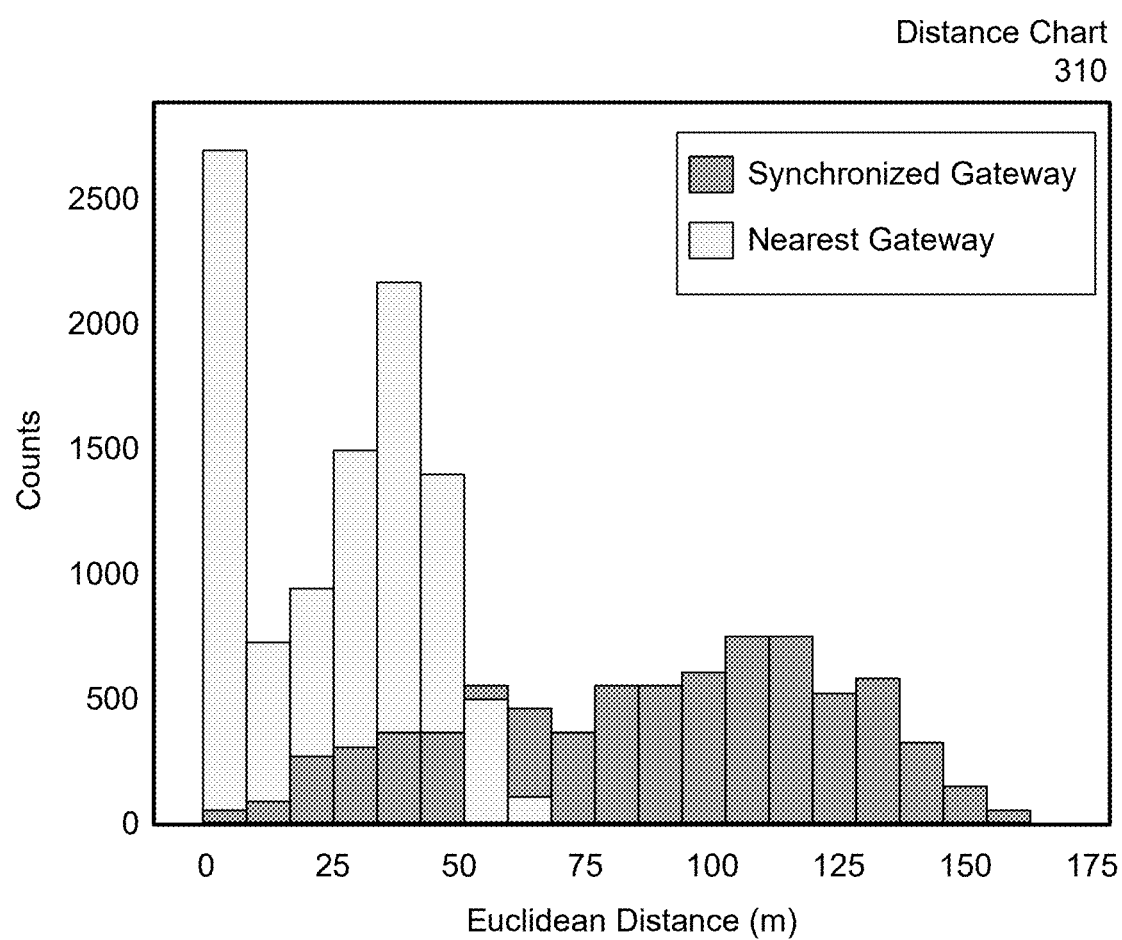
FIG. 3 illustrates a chart comparing a distance to a synchronized gateway and a distance to a nearest gateway.

FIG. 3 illustrates a chart comparing a distance to a synchronized gateway and a distance to a nearest gateway in a hypothetical scenario. As described above, a current beacon discovery process is inefficient as it selects the first beacon signal detected and synchronizes the device 110 with a corresponding gateway component 120, without regard to a distance between the device 110 and the gateway component 120, a signal strength associated with the gateway component 120, and/or the like. Thus, this technique prioritizes quicker discovery (e.g., shorter discovery time) over reliability and/or maximizing a data rate associated with the wireless link. As the current beacon discovery process doesn't take into account the distance to the gateway component 120, a signal strength (e.g., received power) associated with the gateway component 120, signal quality metrics, and/or the like, a distance between the device 110 and the gateway component 120 may be increased. For example, the device 110 may synchronize with a gateway component 120 that is very far away and/or associated with a signal strength that is just above a sensitivity level required to successfully transmit/receive data packets, resulting in a lower reliability of the data transmission due to higher propagation loss and lower receive power of data packets.

To illustrate this issue, distance chart 310 shows results generated by repeating a beacon discovery scenario involving a first number of devices 110 (e.g., 300 devices) and a second number of gateway components 120 (e.g., 100 gateways) for a third number of iterations. As illustrated in FIG. 3, the distance chart 310 illustrates the inefficiency by comparing a first distance between an individual device 110 and a synchronized gateway component 120 to a second distance between the individual device 110 and a nearest gateway component 120 for each device 110 and iteration of the beacon discovery scenario. For example, repeating the scenario a total of 25 times results in 7500 total samples, with each sample corresponding to a first value (e.g., first distance) associated with the synchronized gateway component 120 and a second value (e.g., second distance) associated with the nearest gateway component 120 to which the device 110 could have connected. Thus, the distance chart 310 plots the first distance as a first histogram showing first distance values to the gateway component 120 that a device 110 actually synchronized with, which is represented as a first color (e.g., dark gray), while plotting the second distance as a second histogram showing second distance values to the nearest gateway component 120, which is represented as a second color (e.g., light gray). As shown in the distance chart 310, the first distance values extend across a large range of distances (e.g., up to 150 m) with a wide distribution (e.g., similar number of distance values between 50 m and 130 m), while the second distance values extend across a smaller range of distances (e.g., up to 75 m) with a narrow distribution (e.g., peaks below 50 m). Thus, the distance chart 310 illustrates that the existing beacon discovery process selects gateway components 120 that are much farther than a nearest gateway component 120 with which the device 110 could synchronize, which may decrease a received power and/or reliability of the connection.

FIG. 4 is a component diagram illustrating example network architecture according to embodiments of the present disclosure. As illustrated in FIG. 4, network architecture 400 may include a mobile device 30, shared resources 125, a gateway component 120, and a device 110. In some examples, the shared resources 125 may provide services and/or enable functionality to the mobile device 30, the gateway component 120, and/or the device 110. For example, the shared resources 125 may provide services and/or enable functionality using a routing and authentication component 432, a network coverage component 434, a device services component 436, and/or the like, although the disclosure is not limited thereto.

As illustrated in the network architecture 400, the mobile device 30 and/or the gateway component may communicate directly with the shared resources 125, while the device 110 may communicate with the shared resources 125 via the gateway component 120. Thus, the gateway component 120 may be configured to extend the shared resources 125 to the device 110 by routing traffic to and from the device 110.

As illustrated in FIG. 4, the mobile device 30, the device 110, and/or the gateway component 120 may communicate using a cellular component 412, a Wi-Fi® component 414, a Bluetooth Low Energy (BLE) component 416, a sub-GHz component 417, and/or the like. For example, the mobile device 30 may use the cellular component 412 to communicate with the shared resources 125 via a cellular link 422, may use the Wi-Fi® component 414 to communicate with the shared resources 125 via a Wi-Fi® link 424, and/or may use the BLE component 416 to communicate with the device 110 via a Bluetooth link 426. While not illustrated in FIG. 4, the mobile device 30 may also communicate with the gateway component 120 via the cellular link 422, the Wi-Fi® link 424, and/or the Bluetooth link 426 without departing from the disclosure.

As illustrated in FIG. 4, the gateway component 120 may communicate with the shared resources 125 via a direct link 420. In some examples, the direct link 420 may correspond to a wireless connection, such as the cellular link 422, the Wi-Fi® link 424, and/or the like, but the disclosure is not limited thereto and the direct link 420 may correspond to a wired connection without departing from the disclosure. In addition, the gateway component 120 may communicate with the device 110 using the BLE component 416, the sub-GHz component 417, and/or the like. For example, the gateway component 120 may use the BLE component 416 to communicate with the device 110 via the Bluetooth link 426, may use the sub-GHz component 417 to communicate with the device 110 via a sub-GHz link 427, and/or the like, although the disclosure is not limited thereto. While not illustrated in FIG. 4, in some examples the gateway component 120 may use the Wi-Fi® component 414 to communicate with the device 110 and/or the mobile device 30 via a Wi-Fi® link 424, although the disclosure is not limited thereto.

As described above, the device 110 may communicate with the gateway component 120 via the sub-GHz frequency band using one or more modulation schemes without departing from the disclosure. For example, the device 110 may communicate with the gateway component 120 using a first modulation scheme (e.g., frequency shift keying (FSK) modulation scheme), a second modulation scheme (e.g., Chirp Spread Spectrum (CSS) modulation scheme, such as LoRa (Long Range)), and/or a third modulation scheme (e.g., Orthogonal Frequency Division Multiplexing (OFDM) modulation scheme). Thus, the network architecture 400 illustrates that the sub-GHz component 417 may communicate with the sub-GHz link 427 using a first component (e.g., SubG-FSK component 418) and/or a second component (e.g., SubG-CSS component 419), although the disclosure is not limited thereto.

In some examples, the cellular component 412 may correspond to a cellular radio and the cellular link 422 may correspond to a wireless area network (WAN) interface, the Wi-Fi® component 414 may correspond to a radio using Wi-Fi® protocols and the Wi-Fi® link 424 may correspond to a wireless local area network (WLAN) interface, and the BLE component 416 may correspond to a radio using Bluetooth protocols (e.g., BLE protocols) and the Bluetooth link 426 may correspond to a personal area network (PAN) interface, although the disclosure is not limited thereto. Additionally or alternatively, the Wi-Fi® component 414 may utilize frequencies in the 2.4 GHz and 5 GHz Industrial Scientific and Medicine (ISM) bands, the BLE component 416 may utilize the 2.4 GHz ISM bands, while the sub-GHz component 417 may operate in the ISM spectrum bands below 1 GHz, such as in the 769-935 MHz, 315 MHz, and the 468 MHz frequency range. For example, the frequency ranges used by the sub-GHz component 417 can be from a few hundred kilohertz (kHz) to several hundred megahertz (MHz) (e.g., 169 MHz, 433 MHz, 868 MHz, and 915 MHz) without departing from the disclosure.

As used herein, the sub-GHz component 417 may correspond to a radio operating in a sub-GHz frequency band and the sub-GHz link 427 may correspond to either a Personal Area Network (PAN) or a Wide Area Network (WAN) without departing from the disclosure. For example, the PAN may integrate device(s) 110 and/or gateway component(s) 120 that are associated with a single user profile, whereas the WAN may integrate device(s) 110 and/or gateway component(s) 120 associated with multiple user profiles (e.g., independent of ownership).

As used herein, the PAN enables the device(s) 110 and/or gateway component(s) 120 associated with the user profile to bypass data limit restrictions and/or security or authentication requirements. For example, the device(s) 110 and/or gateway component(s) 120 within the PAN area may share the same security key called a PAN key or a broadcast key. The PAN can include one or more gateway components 120, which are central nodes of the PAN and can serve one or more devices 110. For example, the gateway component 120 may connect the device 110 to the shared resources 125 via the network(s) 199.

In contrast, each device 110 within the WAN area has its own unique device key, which changes periodically. Thus, the shared resources 125 may take responsibility for ensuring authenticity and performing routing and authentication. The WAN can include multiple gateway components 120 that serve one or multiple devices 110. For example, the gateway component 120 may connect the device 110 to the shared resources 125 via the network(s) 199. Unless there are restrictions in place, each of the gateway components 120 is configured to serve any of the devices 110, such that the gateway components 120 provide connectivity beyond the limit of the PAN. Thus, the gateway component 120 may serve as a passthrough device (e.g., passthrough node), and endpoint to endpoint communication is not supported.

The system 100 may be configured to incorporate user permissions and may only perform activities disclosed herein if approved by a user (e.g., user profile). As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located. To illustrate an example of incorporating user permissions, a user profile associated with an individual gateway component 120 may restrict usage of the gateway component 120, such that the gateway component 120 is restricted from supporting devices 110 that are not associated with the user profile.

Figure 5A:
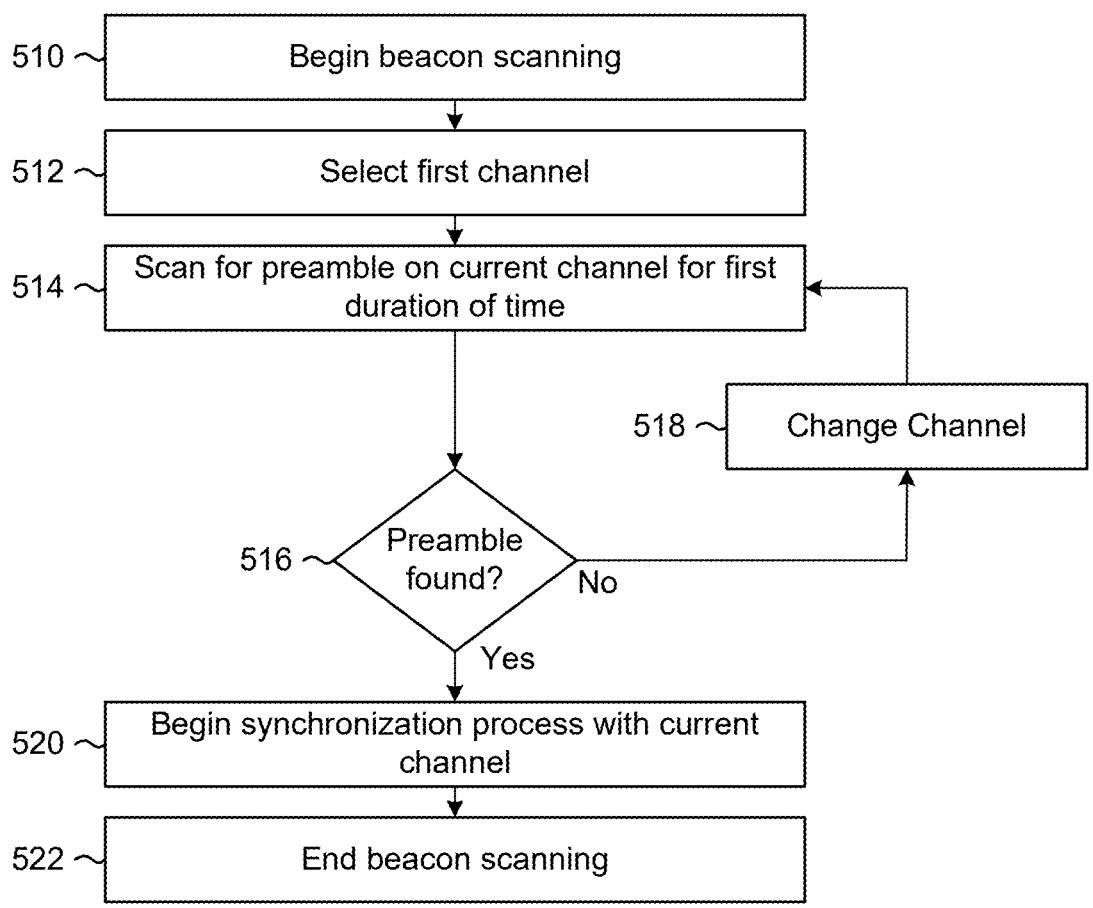
FIGS. 5A-5D are flowcharts conceptually illustrating example methods for performing beacon scanning according to embodiments of the present disclosure.
Figure 5B:
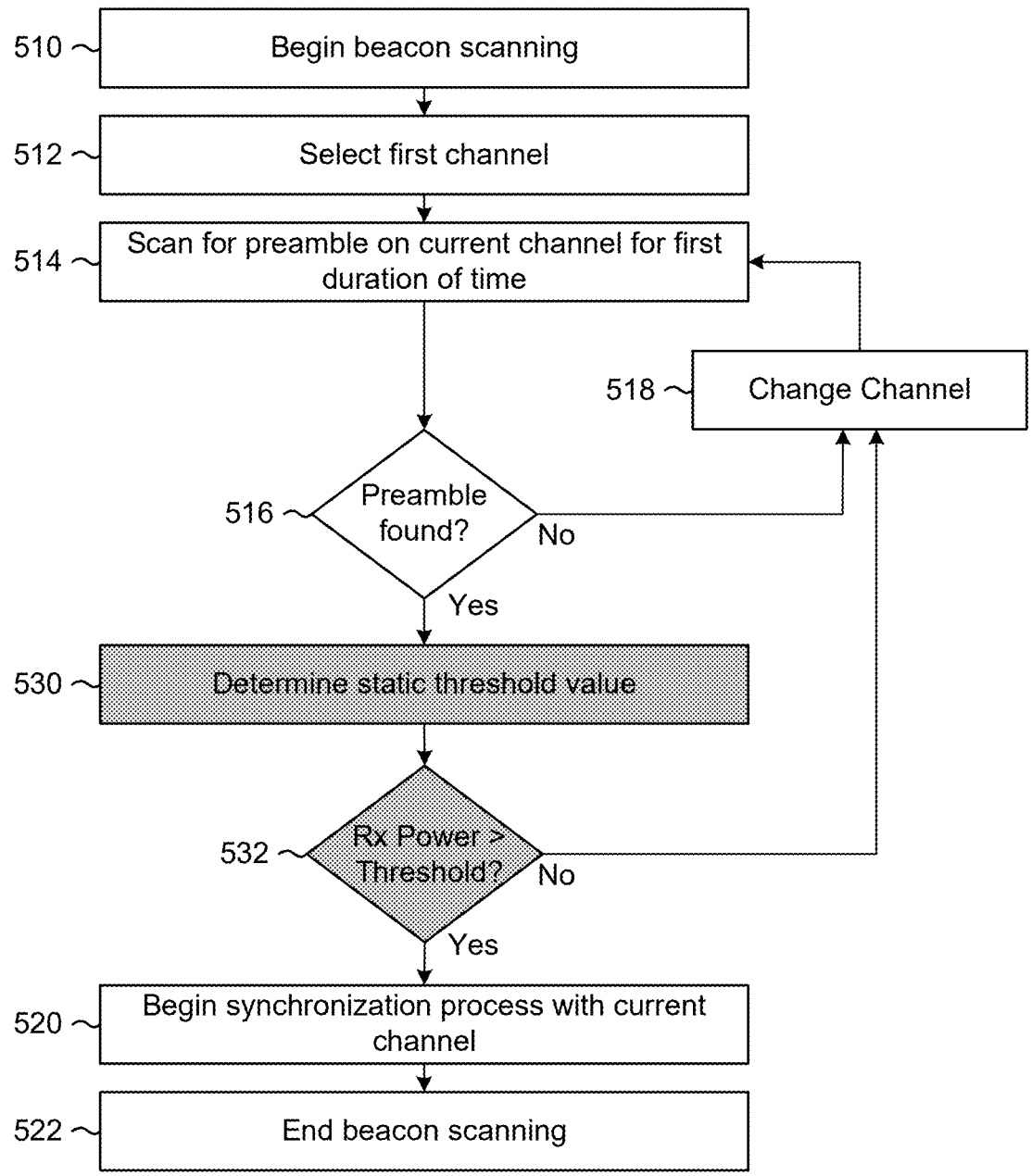
Figure 5C:
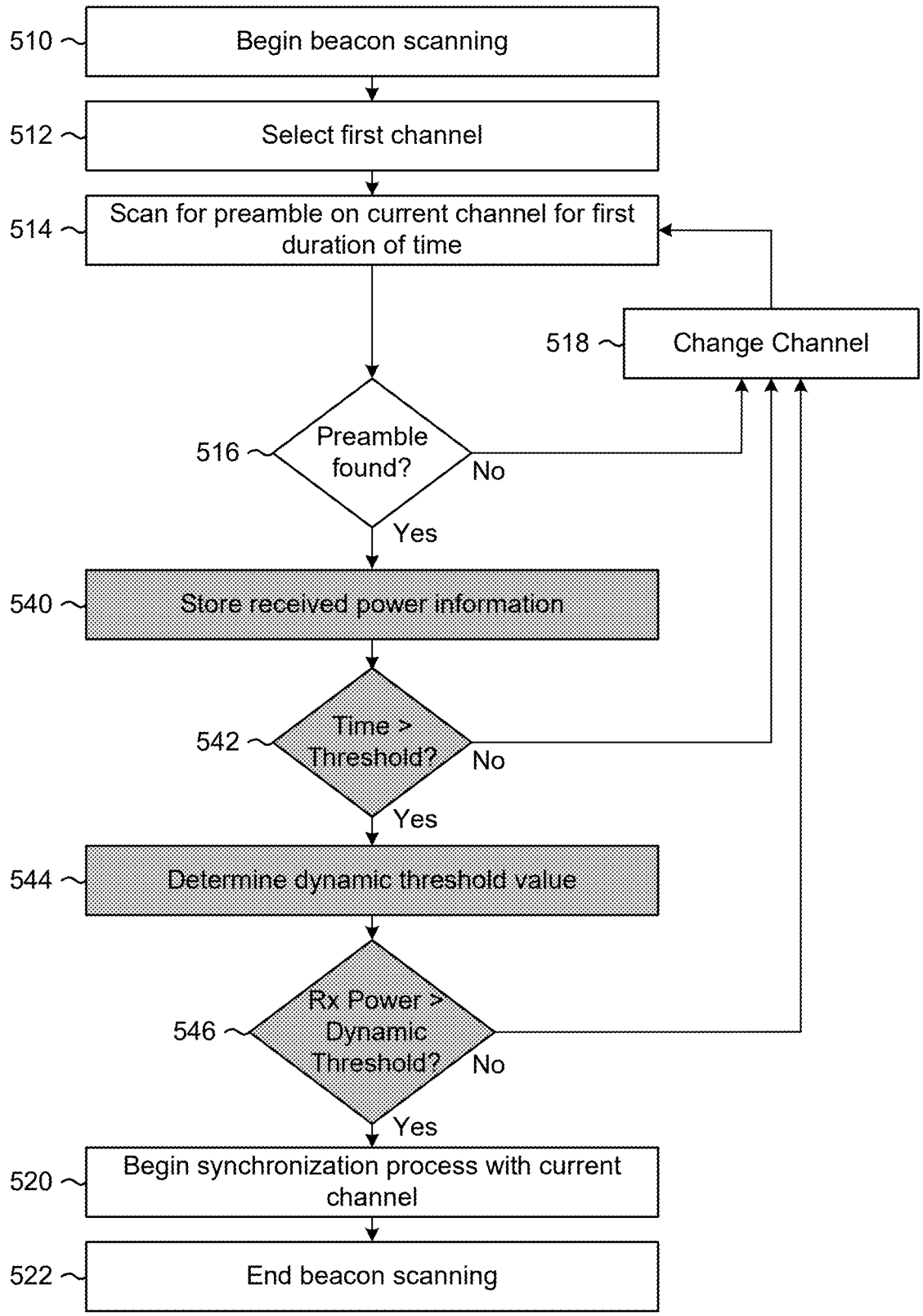
Figure 5D:
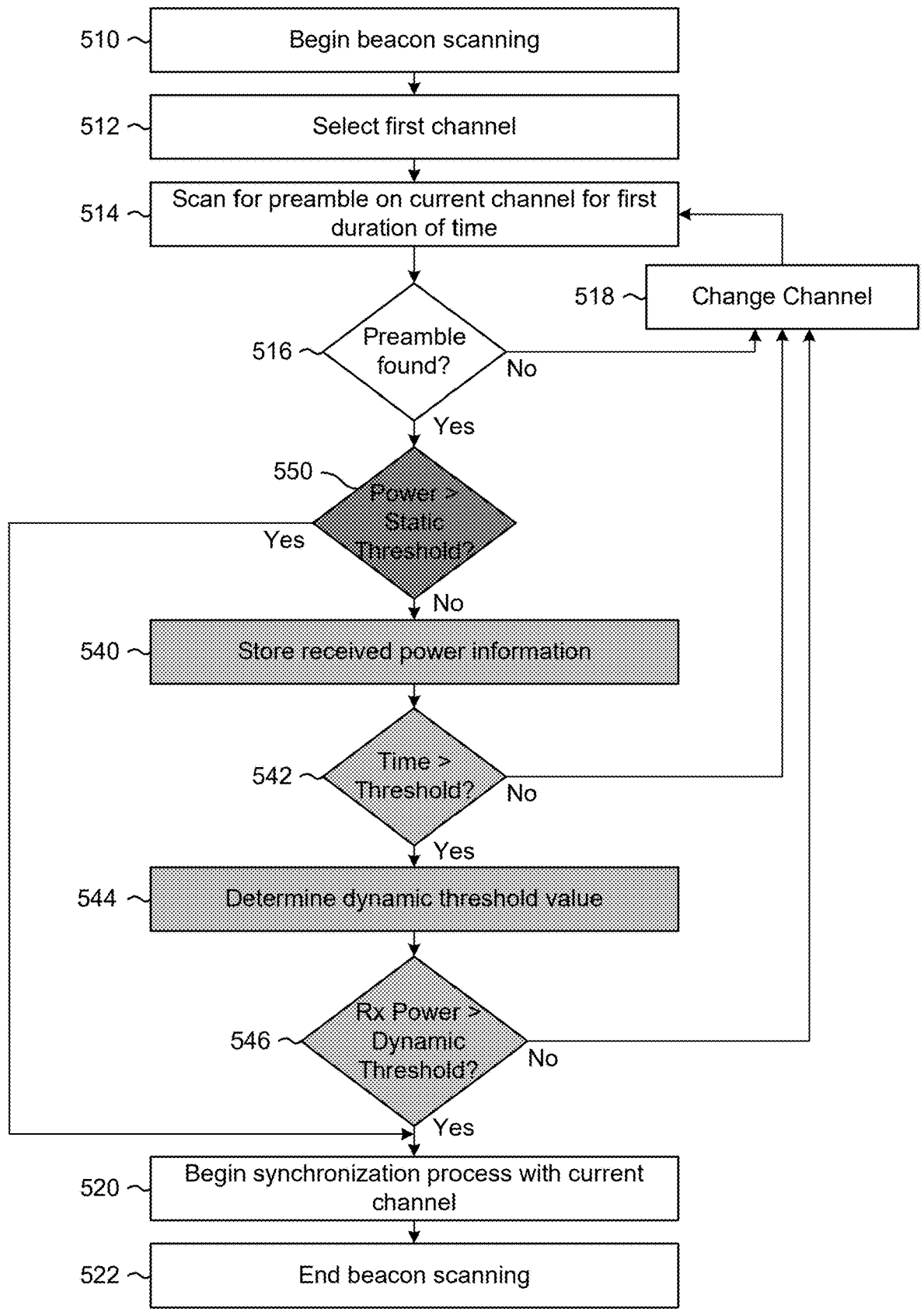

FIGS. 5A-5D are flowcharts conceptually illustrating example methods for performing beacon scanning according to embodiments of the present disclosure. As will be described in greater detail below, FIG. 5A illustrates an example of performing beacon discovery and connecting to the first gateway detected, FIG. 5B illustrates an example of performing beacon discovery using a static threshold, FIG. 5C illustrates an example of performing beacon discovery using a dynamic threshold, and FIG. 5D illustrates an example of performing beacon discovery using both a static threshold and a dynamic threshold.

As illustrated in FIG. 5A, the device 110 may begin (510) beacon scanning to initiate beacon discovery and may select (512) a first channel. The device 110 may scan (514) for a preamble on the current channel for a first duration of time and determine (516) whether a preamble is found. If the device 110 does not detect a preamble within the first duration of time, the device 110 may change (518) the channel and loop to step 514 to scan for a preamble on the current channel. By changing the channel when the preamble is not detected, the device 110 may be configured to scan through available channels using a variety of techniques. For example, the device 110 may increment the channel, decrement the channel, perform channel hopping, and/or change the channel using other techniques without departing from the disclosure.

Once a preamble is found, the device 110 may begin (520) a synchronization process with the current channel and end (522) beacon scanning. For example, the current channel may correspond to a first gateway component 120a and the device 110 may synchronize timing information with the first gateway component 120a. Additionally or alternatively, if a channel on which the first gateway component 120a broadcasts a beacon signal varies over time, part of the synchronization process may include the device 110 determining a frequency hopping seed associated with the first gateway component 120a, although the disclosure is not limited thereto. For example, the device 110 may use the frequency hopping seed and a channel hopping algorithm to identify a correct channel on which to receive future beacon signals from the first gateway component 120a without departing from the disclosure.

In some examples, the device 110 may iteratively scan each channel by incrementing the current channel until a preamble is detected. The disclosure is not limited thereto, however, and in other examples the device 110 may scan through one or more channels until a preamble is detected using other techniques without departing from the disclosure. Using the technique illustrated in FIG. 5A, the device 110 connects to the first beacon it detects, without regard to a distance to the gateway, a signal strength of the beacon signal, and/or the like.

In some examples, the device 110 may improve beacon discovery by using a static threshold. For example, the device 110 may be configured to only connect to a gateway that is associated with a signal strength above a static threshold value. In some examples, the static threshold value may be constant for all devices and/or system conditions, such that the device 110 will connect with a gateway having a signal strength that exceeds a first value (e.g., −100 dBm), regardless of system conditions or type of device. However, the disclosure is not limited thereto and in other examples the static threshold value may be unique to the device type and/or the system conditions without departing from the disclosure.

As illustrated in FIG. 5B, the device 110 may begin (510) beacon scanning to initiate beacon discovery and may select (512) a first channel. The device 110 may scan (514) for a preamble on the current channel for the first duration of time and determine (516) whether a preamble is found. If the device 110 does not detect a preamble within the first duration of time, the device 110 may change (518) the channel and loop to step 514 to scan for a preamble on new channel. By changing the channel when the preamble is not detected, the device 110 may be configured to scan through available channels using a variety of techniques. For example, the device 110 may increment the channel, decrement the channel, perform channel hopping, and/or change the channel using other techniques without departing from the disclosure.

Once a preamble is found, the device 110 may determine (530) the static threshold value and determine (532) whether a signal strength (e.g., received power) exceeds the static threshold value. For example, the device 110 may retrieve the static threshold value from a storage component and compare the signal strength to the static threshold value. However, the disclosure is not limited thereto, and in some examples the device 110 may determine the static threshold value and/or receive the static threshold value from a gateway component 120 without departing from the disclosure.

In some examples, the static threshold value may be a global static threshold that is used by a plurality of devices 110, regardless of system conditions, device type, and/or the like. For example, the static threshold value may correspond to the first value (e.g., −100 dBm), which is just above the minimum signal strength required to maintain a reliable connection. The disclosure is not limited thereto, however, and the static threshold value may correspond to a second value (e.g., −90 dBm) and/or the like without departing from the disclosure. In other examples, the static threshold value may depend on a hardware configuration associated with the device 110, such as a device type, device model, and/or the like. For example, a first device type (e.g., natural gas detector) may be considered stationary and/or installed at a fixed location, in which case the system 100 may use the second value (e.g., −90 dBm) to prioritize reliability over speed of beacon discovery. In contrast, a second device type (e.g., car tracker) may be considered mobile and/or installed in a vehicle capable of movement, in which case the system 100 may use the first value (e.g., −100 dBm) to prioritize speed of beacon discovery over reliability.

In some examples, the static threshold value may depend on system conditions without departing from the disclosure. For example, the static threshold value may be location based, such that a first geographic location may be associated with a large number of gateway components 120 (e.g., urban area) and the system 100 may use the second value (e.g., −90 dBm), while a second geographic location may be associated with a small number of gateway components 120 (e.g., rural area) and the system 100 may use the first value (e.g., −100 dBm), although the disclosure is not limited thereto. In other examples, the static threshold value may be based on a speed of the device 110, such that the system 100 may use the first value (e.g., −100 dBm) when the speed of the device 110 satisfies a condition (e.g., exceeds a speed threshold value) and use the second value (e.g., −90 dBm) when the speed of the device 110 does not satisfy the condition (e.g., is below the speed threshold value). While the example above refers to exceeding the speed threshold value as satisfying the condition, the disclosure is not limited thereto and the system 100 may determine that a speed below the speed threshold value satisfies a condition without departing from the disclosure.

As described above, in some examples the device 110 may determine the static threshold value and/or receive the static threshold value from a gateway component 120 without departing from the disclosure. For example, based on a number of and/or distribution of the gateway components 120, an available bandwidth of the network, and/or other system conditions, the system 100 may determine a network-assisted static threshold and transmit the network-assisted static threshold to the device 110 to improve future beacon discovery performed by the device 110.

If the signal strength (e.g., received power) does not exceed the static threshold value in step 532, the device 110 may loop to step 518 and continue scanning additional channels. However, if the signal strength exceeds the static threshold value, the device 110 may begin (520) the synchronization process with the current channel and end (522) beacon scanning. Thus, the device 110 may scan channels until a preamble is detected with a signal strength that exceeds the static threshold value. Using the technique illustrated in FIG. 5B, the device 110 improves a signal strength associated with the gateway component 120 and guarantees that it satisfies the static threshold. However, there is a tradeoff between improving the signal strength and increasing an amount of time required for the beacon discovery process. For example, a higher static threshold results in the beacon discovery process requiring additional time and/or not connecting to a gateway if none of the beacons satisfy the static threshold, whereas a lower static threshold decreases the amount of time required for the beacon discovery process but may suffer from unreliable connections (e.g., gateway is farther away).

In some examples, the device 110 may further improve beacon discovery by using a dynamic threshold. For example, the device 110 may be configured to measure a signal strength of multiple beacons for a second duration of time in order to determine a dynamic threshold value. For example, the device 110 may calculate an average value of the signal strengths detected during the second duration of time, such that the device 110 only connects to a gateway associated with a signal strength above the average value. However, the disclosure is not limited thereto and the device 110 may calculate the dynamic threshold value using statistical analysis of the signal strength distribution (e.g., n-th percentile, median, mean, etc.) without departing from the disclosure. By calculating the dynamic threshold value using an actual distribution of the detected signal strengths, the device 110 may select a gateway component 120 in closer proximity to the device 110 and/or increase a reliability of the connection without greatly increasing the amount of time required to perform beacon discovery.

As illustrated in FIG. 5C, the device 110 may begin (510) beacon scanning to initiate beacon discovery and may select (512) a first channel. The device 110 may scan (514) for a preamble on the current channel for the first duration of time and determine (516) whether a preamble is found. If the device 110 does not detect a preamble within the first duration of time, the device 110 may change (518) the channel and loop to step 514 to scan for a preamble on the current channel. By changing the channel when the preamble is not detected, the device 110 may be configured to scan through available channels using a variety of techniques. For example, the device 110 may increment the channel, decrement the channel, perform channel hopping, and/or change the channel using other techniques without departing from the disclosure.

Once a preamble is found, the device 110 may store (540) received power information associated with the detected beacon, as described in greater detail below and illustrated in FIGS. 6A-6C. The device 110 may determine (542) whether a time threshold has been exceeded (e.g., that a first amount of time has elapsed since beginning beacon scanning in step 510) and, if not, may loop to step 518 and continue scanning additional channels. Thus, the device 110 may continue scanning channels until the time threshold is exceeded, at which point the device 110 may determine (544) a dynamic threshold value using the received power information.

In some examples, the device 110 may store the received power information using a low-power implementation involving a counter component and a summing component, as described in greater detail below with regard to FIG. 6A. For example, when the device 110 begins performing beacon scanning in step 510, the device 110 may reset the counter component and the summing component by setting them to a value of zero. As the device 110 detects each beacon, the device 110 may determine a signal strength value associated with the beacon, may add the signal strength value to a first sum (e.g., aggregate value) stored in the summing component, and may increment a counter value stored in the counter component. The device 110 may then determine the dynamic threshold value using the first sum and the counter value, such as by dividing the first sum by the counter value to determine an average signal strength. Thus, the device 110 maintains a running average of the received signal strength values until the time threshold has been exceeded, at which point the device 110 uses the running average as the dynamic threshold value. While the example described above refers to the device 110 using the received power information to update the first sum and the counter value, without storing the actual signal strength value itself, the disclosure is not limited thereto and the device 110 may use the signal strength value to perform other operations without departing from the disclosure. Additionally or alternatively, the device 110 may individually store each of the signal strength values without departing from the disclosure.

Instead of calculating a running average of the signal strength values, the device 110 may store the received power information as distribution data that represents a distribution of the gateway components 120, as described in greater detail below with regard to FIG. 6B. In some examples, the device 110 may generate distribution data that includes a series of signal strength values that correspond to each of the beacons detected within the time threshold. Thus, the device 110 may store the received power information by generating and/or updating the distribution data to include the signal strength value. For example, the distribution data may correspond to a vector that includes a plurality of signal strength values, and the device 110 may store the received power information by adding the signal strength value as a new entry in the vector. The disclosure is not limited thereto, however, and in other examples the device 110 may update the distribution data using other techniques without departing from the disclosure. For example, the device 110 may perform statistical analysis to generate distribution data that represents a distribution of the plurality of signal strength values without storing individual signal strength values. Thus, the distribution data may represent a distribution of the plurality of signal strength values using two or more parameters (e.g., mean and variance), and each time the device 110 stores the received power information in step 540 the device 110 may update the two or more parameters using the signal strength value.

In some examples, the device 110 may store the received power information as beacon data that includes additional information about the beacons and/or the gateway components 120, as described in greater detail below with regard to FIG. 6C. For example, the device 110 may generate and/or update the beacon data to indicate an individual beacon and a corresponding signal strength (e.g., received power) associated with the beacon. To illustrate an example, the device 110 may store the signal strength along with a beacon identifier that identifies the gateway component 120, a network associated with the gateway component 120, and/or the like, although the disclosure is not limited thereto. Thus, the beacon identifier may correspond to and/or be similar to device identification (e.g., device identifier associated with the gateway component 120), network identification (e.g., service set identification (SSID), media access control (MAC) address, and/or the like), and/or the like without departing from the disclosure. By storing the beacon data, the system 100 may enable the device 110 to connect to a gateway component 120 associated with a highest signal strength after the time threshold is exceeded, without performing a second round of beacon discovery.

After determining the dynamic threshold value, the device 110 may determine (546) whether the signal strength (e.g., received power) exceeds the dynamic threshold value. If the signal strength does not exceed the dynamic threshold value, the device 110 may loop to step 518 and continue scanning additional channels. However, if the signal strength exceeds the dynamic threshold value, the device 110 may begin (520) the synchronization process with the current channel and end (522) beacon scanning. Thus, the device 110 may scan channels until a preamble is detected with a signal strength that exceeds the dynamic threshold value.

While using the dynamic threshold value improves a signal strength associated with the gateway component 120 and/or a reliability of the connection, determining the dynamic threshold value introduces a delay. For example, determining the dynamic threshold value requires at least the first duration of time (e.g., time threshold) to detect beacons and measure signal strength values, and in certain system conditions this delay may prevent the device 110 from connecting to any of the gateway components 120. To illustrate an example, if the device 110 is moving at a high rate of speed, the device 110 may be out of range of the gateway components 120 that were used to determine the dynamic threshold value.

To avoid unnecessary delays, in some examples the device 110 may perform beacon discovery using both a static threshold and a dynamic threshold. For example, the device 110 may use the static threshold described above with regard to FIG. 5B to quickly connect to a gateway component 120 if any gateway component 120 is associated with a high signal strength value (e.g., −70 dBm), but may determine the dynamic threshold described above with regard to FIG. 5C if the signal strength values don't exceed the static threshold. Thus, while the static threshold used in FIG. 5B corresponds to a minimum acceptable signal strength value (e.g., −90 dBm, −100 dBm, etc.), the static threshold used in this example corresponds to a strong signal strength value (e.g., −80 dBm or higher).

As illustrated in FIG. 5D, the device 110 may begin (510) beacon scanning to initiate beacon discovery and may select (512) a first channel. The device 110 may scan (514) for a preamble on the current channel for the first duration of time and determine (516) whether a preamble is found. If the device 110 does not detect a preamble within the first duration of time, the device 110 may change (518) the channel and loop to step 514 to scan for a preamble on the current channel. By changing the channel when the preamble is not detected, the device 110 may be configured to scan through available channels using a variety of techniques. For example, the device 110 may increment the channel, decrement the channel, perform channel hopping, and/or change the channel using other techniques without departing from the disclosure.

Once a preamble is found, the device 110 may determine (550) whether the signal strength (e.g., received power) exceeds the static threshold value. If the signal strength exceeds the static threshold value, the device 110 may begin (520) the synchronization process with the current channel and end (522) beacon scanning. Thus, the device 110 may avoid an unnecessary delay by connecting to the gateway component 120 without determining the dynamic threshold.

However, if the signal strength does not exceed the static threshold value, the device 110 may store (540) the received power information associated with the detected beacon and may determine (542) whether a time threshold has been exceeded (e.g., that a first amount of time has elapsed since beginning beacon scanning in step 510). If the time threshold has not been exceeded, the device 110 may loop to step 518 and continue scanning additional channels. Thus, the device 110 may continue scanning channels until the time threshold is exceeded, at which point the device 110 may determine (544) the dynamic threshold value using the received power information.

After determining the dynamic threshold value, the device 110 may determine (546) whether the signal strength (e.g., received power) exceeds the dynamic threshold value. If the signal strength does not exceed the dynamic threshold value, the device 110 may loop to step 518 and continue scanning additional channels. However, if the signal strength exceeds the dynamic threshold value, the device 110 may begin (520) the synchronization process with the current channel and end (522) beacon scanning. Thus, the device 110 may scan channels until a preamble is detected with a signal strength that exceeds the static threshold value and/or the dynamic threshold value.

Figure 6A:
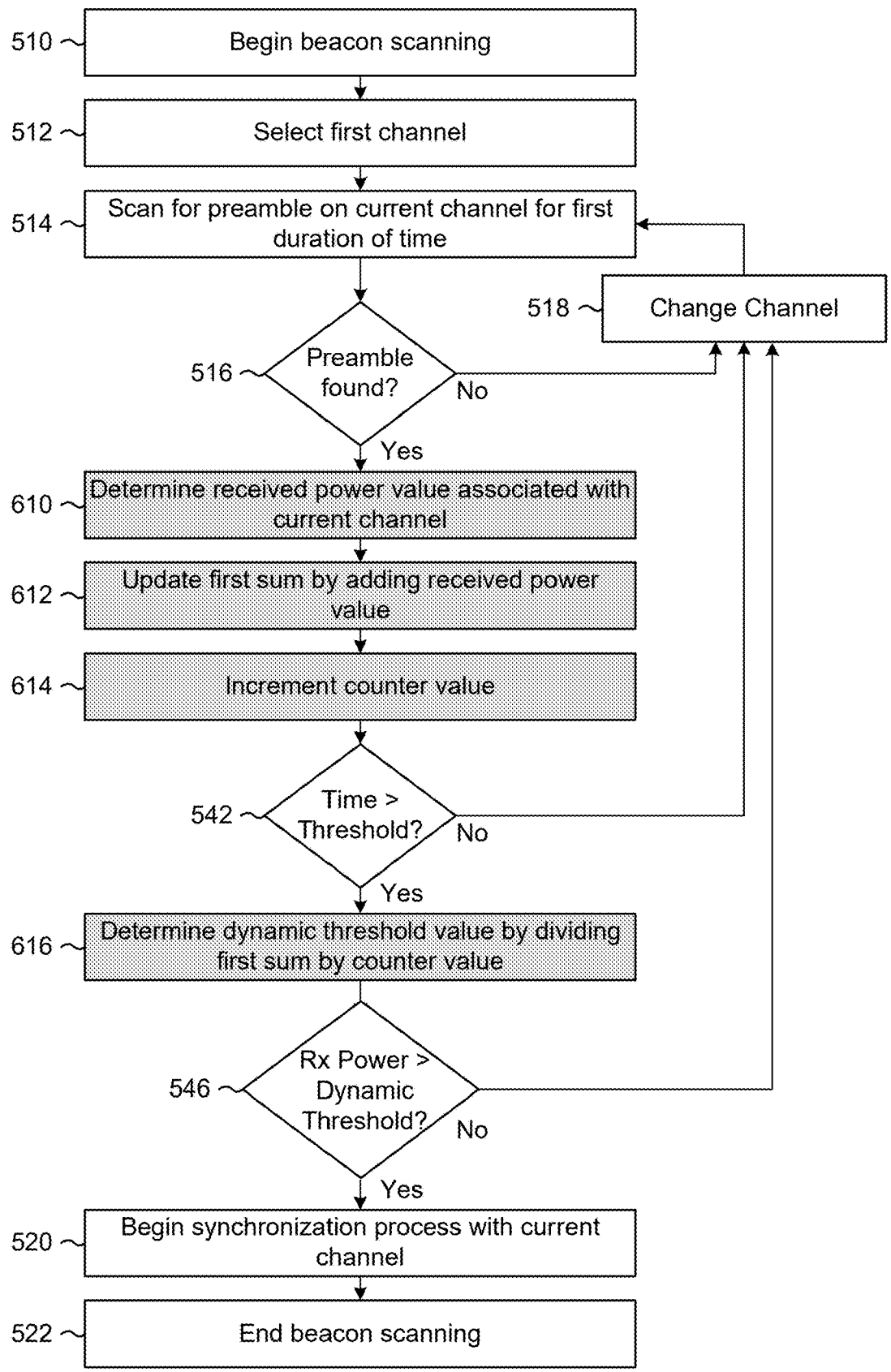
FIGS. 6A-6C are flowcharts conceptually illustrating example methods for performing dynamic beacon scanning according to embodiments of the present disclosure.
Figure 6B:
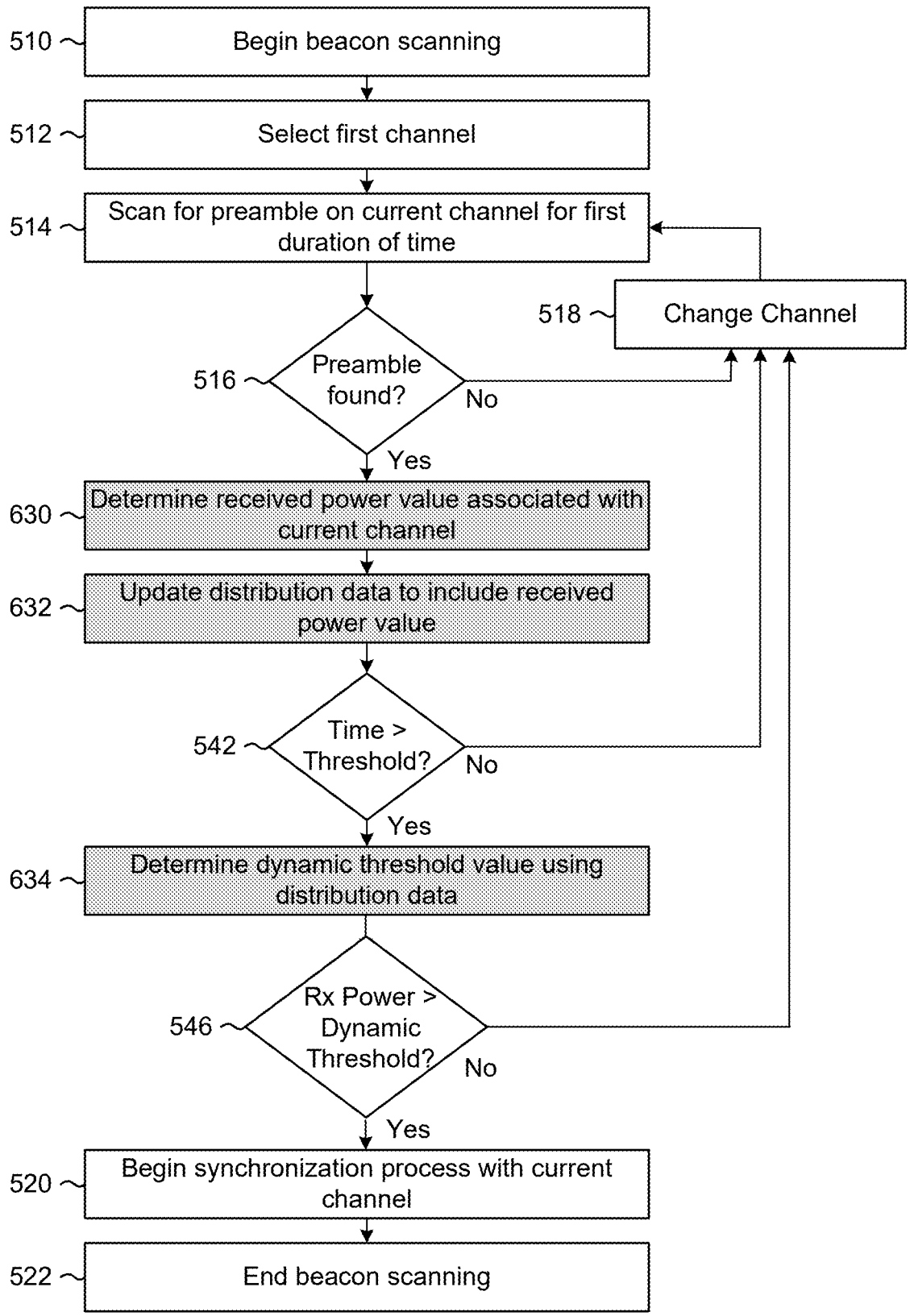
Figure 6C:
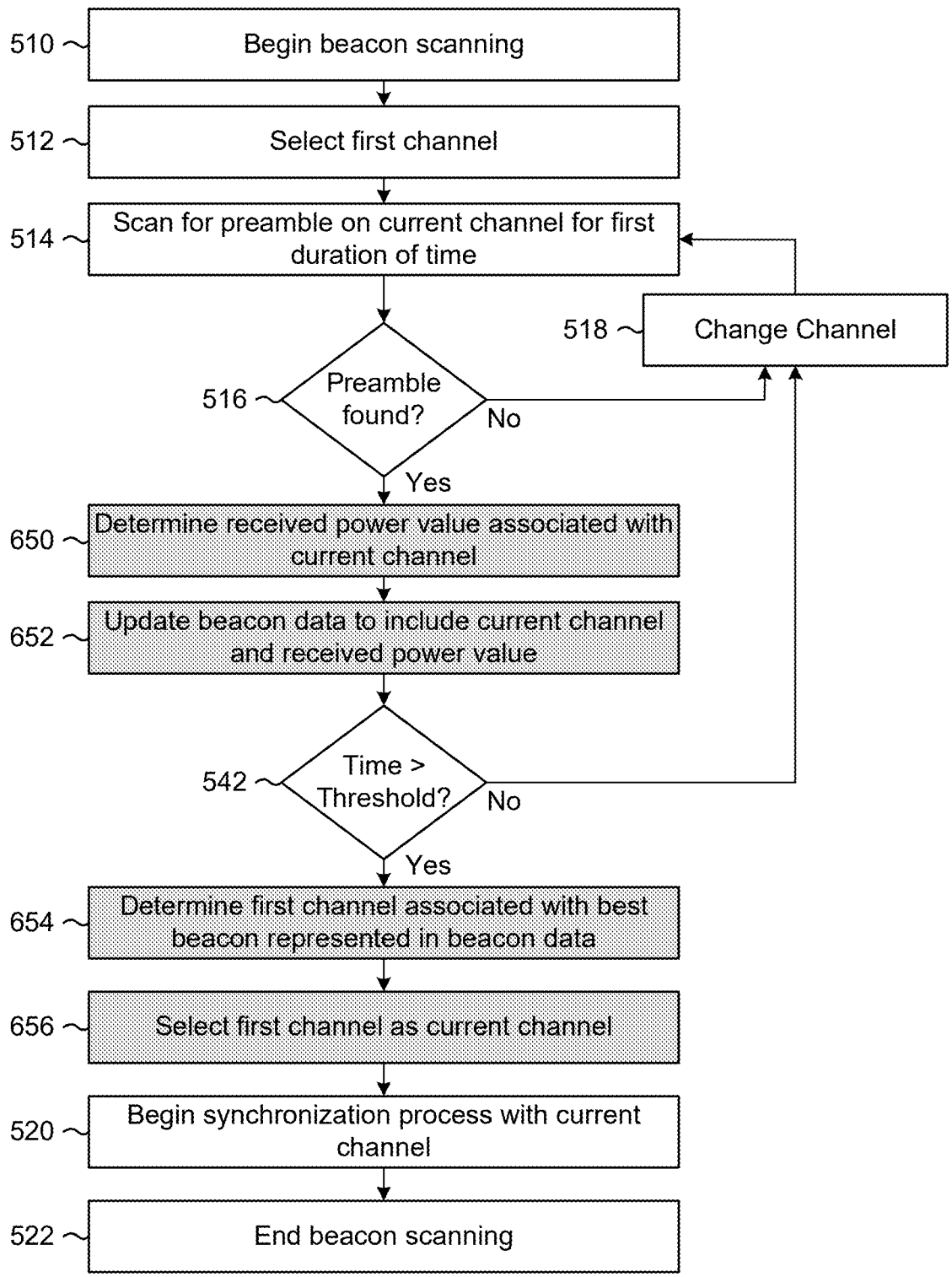

FIGS. 6A-6C are flowcharts conceptually illustrating example methods for performing dynamic beacon scanning according to embodiments of the present disclosure. As illustrated in FIGS. 6A-6C, the device 110 may store the received power information using three different techniques, although the disclosure is not limited thereto. For example, FIG. 6A illustrates a first example in which the device 110 may store the received power value (e.g., signal strength value) by updating a first sum and incrementing a counter value, FIG. 6B illustrates a second example in which the device 110 may store the received power value by updating distribution data representing a distribution of the beacon power values, and FIG. 6C illustrates a third example in which the device 110 may store the received power value by updating beacon data that includes information about detected beacon(s) and corresponding power values.

As illustrated in FIG. 6A, in some examples the device 110 may store the received power information using a low-power implementation involving a counter component and a summing component. For example, when the device 110 begins performing beacon scanning in step 510, the device 110 may reset the counter component and the summing component by setting them to a value of zero. As the device 110 detects each beacon, the device 110 may determine a signal strength value associated with the beacon, may add the signal strength value to a first sum (e.g., aggregate value) stored in the summing component, and may increment a counter value stored in the counter component.

Referring to FIG. 6A, after detecting the preamble in step 516, the device 110 may determine (610) a received power value associated with the current channel, may update (612) a first sum by adding the received power value, and may increment (614) a counter value associated with the counter component.

After determining that the time threshold is exceeded in step 542, the device 110 may determine (616) the dynamic threshold value using the first sum and the counter value, such as by dividing the first sum by the counter value to determine an average signal strength. Thus, the device 110 maintains the first sum and/or a running average of the received signal strength values until the time threshold has been exceeded, at which point the device 110 may use the average as the dynamic threshold value.

As illustrated in FIG. 6B, in other examples the device 110 may store the received power information as distribution data that represents a distribution of the gateway components 120. For example, after detecting the preamble in step 516, the device 110 may determine (630) a received power value associated with the current channel and may update (632) distribution data to include the received power value.

In some examples, the distribution data may include a series of signal strength values that correspond to each of the beacons detected within the time threshold. Thus, the device 110 may store the received power information by generating and/or updating the distribution data to include the signal strength value. For example, the distribution data may correspond to a vector that includes a plurality of signal strength values, and the device 110 may store the received power information by adding the signal strength value as a new entry in the vector. The disclosure is not limited thereto, however, and in other examples the device 110 may update the distribution data using other techniques without departing from the disclosure. For example, the device 110 may perform statistical analysis to generate distribution data that represents a distribution of the plurality of signal strength values without storing individual signal strength values. Thus, the distribution data may represent a distribution of the plurality of signal strength values using two or more parameters (e.g., mean and variance), and each time the device 110 stores the received power information in step 540 the device 110 may update the two or more parameters using the signal strength value.

After determining that the time threshold is exceeded in step 542, the device 110 may determine (634) the dynamic threshold value using the distribution data. For example, the device 110 may determine the dynamic threshold value by calculating an average value of the distribution data. However, the disclosure is not limited thereto, and in some examples the device 110 may determine the dynamic threshold value by calculating an n-th percentile of the distribution data and/or using other techniques without departing from the disclosure.

As illustrated in FIG. 6C, in some examples the device 110 may store the received power information as beacon data that includes additional information about the beacons and/or the gateway components 120. For example, the device 110 may generate and/or update the beacon data to indicate an individual beacon and a corresponding signal strength (e.g., received power) associated with the beacon. Referring to FIG. 6C, after detecting the preamble in step 516, the device 110 may determine (650) a received power value associated with the current channel and may update (652) beacon data to include the current channel and the received power value.

To illustrate an example, the device 110 may store the signal strength along with a beacon identifier that identifies the gateway component 120, a network associated with the gateway component 120, and/or the like, although the disclosure is not limited thereto. Thus, the beacon identifier may correspond to and/or be similar to device identification (e.g., device identifier associated with the gateway component 120), network identification (e.g., service set identification (SSID), media access control (MAC) address, and/or the like), and/or the like without departing from the disclosure.

By storing the beacon data, the system 100 may enable the device 110 to connect to a gateway component 120 associated with a best beacon (e.g., highest signal strength) after the time threshold is exceeded, without performing a second round of beacon discovery. For example, after determining that the time threshold is exceeded in step 542, the device 110 may determine (654) a first channel associated with the best beacon represented in the beacon data, select (656) the first channel as the current channel, begin (520) the synchronization process with the current channel, and end (522)

beacon scanning. The device 110 may determine the best beacon signal based on a highest signal strength (e.g., received power value), highest signal quality metric (e.g., measured using RSSI, SNR, SINR, CRC, etc.), and/or the like, although the disclosure is not limited thereto.

In some examples, the device 110 may only store beacon information associated with a single gateway component (e.g., best beacon) in the beacon data. For example, each time the device 110 determines that the received power exceeds the existing value stored in the beacon data, the device 110 may replace the existing value and corresponding beacon information with the current channel and received power value. However, the disclosure is not limited thereto, and in other examples the device 110 may store beacon information associated with the top N beacons (e.g., 3) in the beacon data without departing from the disclosure. Additionally or alternatively, the beacon data may include beacon information associated with every gateway component 120 detected during the time threshold without departing from the disclosure.

In some examples, the beacon data may include a frequency hopping seed, which may correspond to a value used in a channel hopping algorithm. For example, a channel on which an individual gateway component 120 broadcasts a beacon signal may vary over time based on the channel hopping algorithm. Thus, while the device 110 may detect a beacon signal associated with a first gateway component 120a on a first channel during a first time range, the device 110 may be unable to connect to the first gateway component 120a on the first channel during a second time range, as the first gateway component 120a is now broadcasting on a second channel. However, if the device 110 stores the frequency hopping seed associated with the first gateway component 120a as part of the beacon data, the device 110 may connect to the first gateway component 120a on the second channel during the second time range. For example, the device 110 may use the frequency hopping seed, the channel hopping algorithm, and timing information (e.g., timestamp) associated with the first time range to predict that the first gateway component 120a will be broadcasting on the second channel during the second time range.

While FIG. 5D illustrates an example in which the device 110 may perform beacon discovery using both a static threshold and a dynamic threshold in series, the disclosure is not limited thereto. In some examples, the device 110 may instead switch between performing first beacon discovery using a dynamic threshold and second beacon discovery using a static threshold without departing from the disclosure. For example, during first system conditions the device 110 may operate in a first mode and perform the first beacon discovery using the dynamic threshold, while second system conditions may prompt the device 110 to operate in a second mode and perform the second beacon discovery using the static threshold to quickly connect to a gateway component 120.

Figure 7:
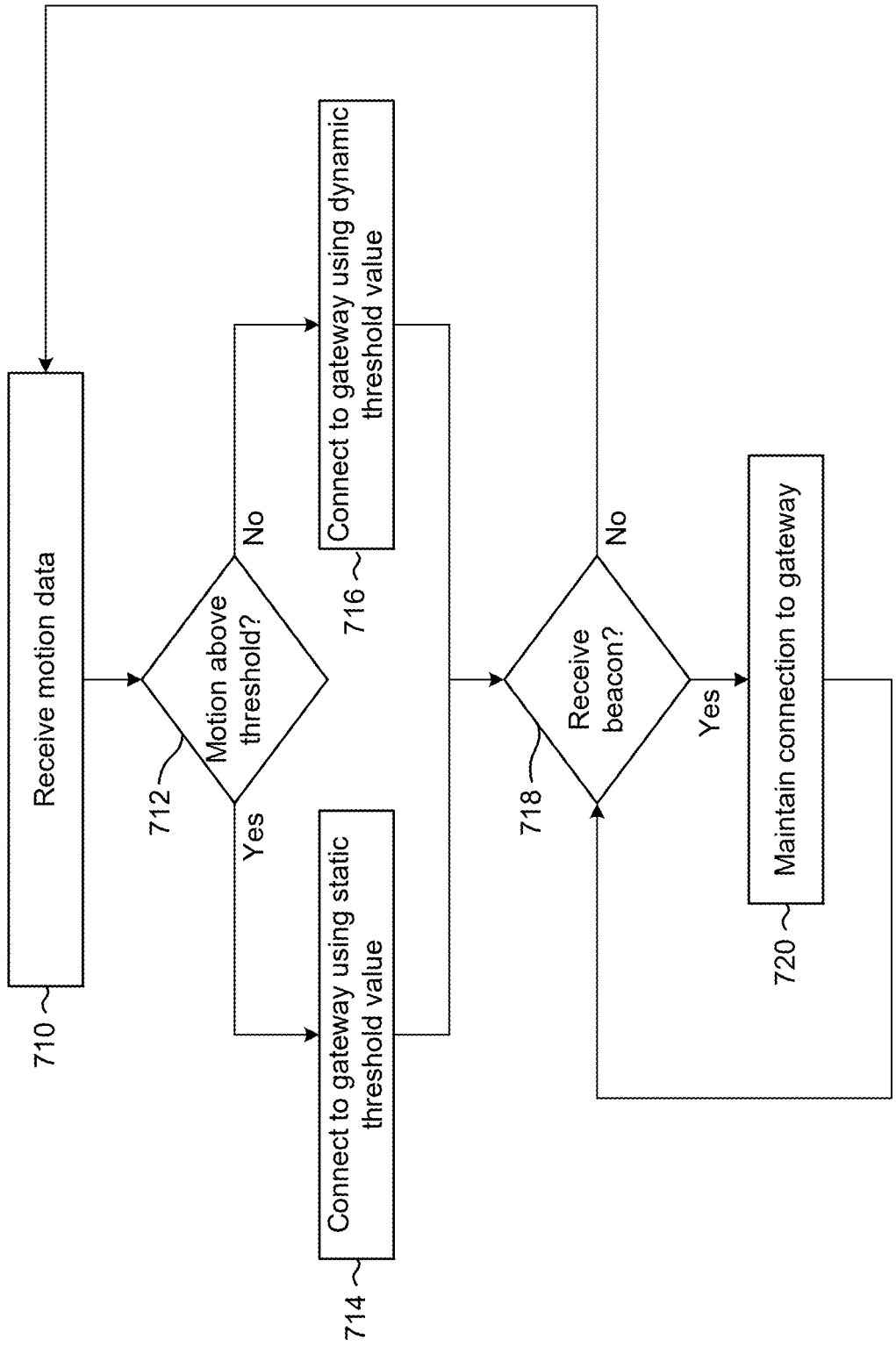
FIG. 7 is a flowchart conceptually illustrating an example method for switching between a static threshold and a dynamic threshold according to embodiments of the present disclosure.

FIG. 7 is a flowchart conceptually illustrating an example method for switching between a static threshold and a dynamic threshold according to embodiments of the present disclosure. As illustrated in FIG. 7, the device 110 may receive (710) motion data and determine (712) that motion associated with the device 110 is above a threshold value. For example, the motion data may indicate movement of the device 110, a speed associated with the device 110, and/or the like. In some examples, the device 110 may determine that the speed of the device 110 exceeds a speed threshold value. If the motion is above the threshold, the device 110 may perform the second beacon discovery and connect (714) to a gateway component 120 using the static threshold value. In contrast, if the motion is below the threshold, the device 110 may perform the first beacon discovery and connect (716) to a gateway component 120 using the dynamic threshold value.

Once connected to the gateway component 120, the device 110 may determine (718) whether a beacon is received from the gateway component 120 within a first duration of time and, if so, may maintain (720) connection to the gateway component. For example, the gateway component 120 may send a beacon signal periodically based on a second duration of time (e.g., every n seconds) and the first duration of time may be a multiple of the second duration of time (e.g., 3n seconds). Thus, the device 110 may miss one or more beacon signals without issue, provided that the device 110 receives a beacon signal within the first duration of time. In some examples, a channel on which the first gateway component 120a broadcasts the beacon signal may vary and the device 110 may use a channel hopping algorithm to identify the correct channel on which to receive the beacon signals, although the disclosure is not limited thereto. If the device 110 misses several beacon signals and hasn't received the beacon signal for the first duration of time, the device 110 may loop to step 710 to perform beacon discovery and connect to a new gateway component 120.

Figure 8A:
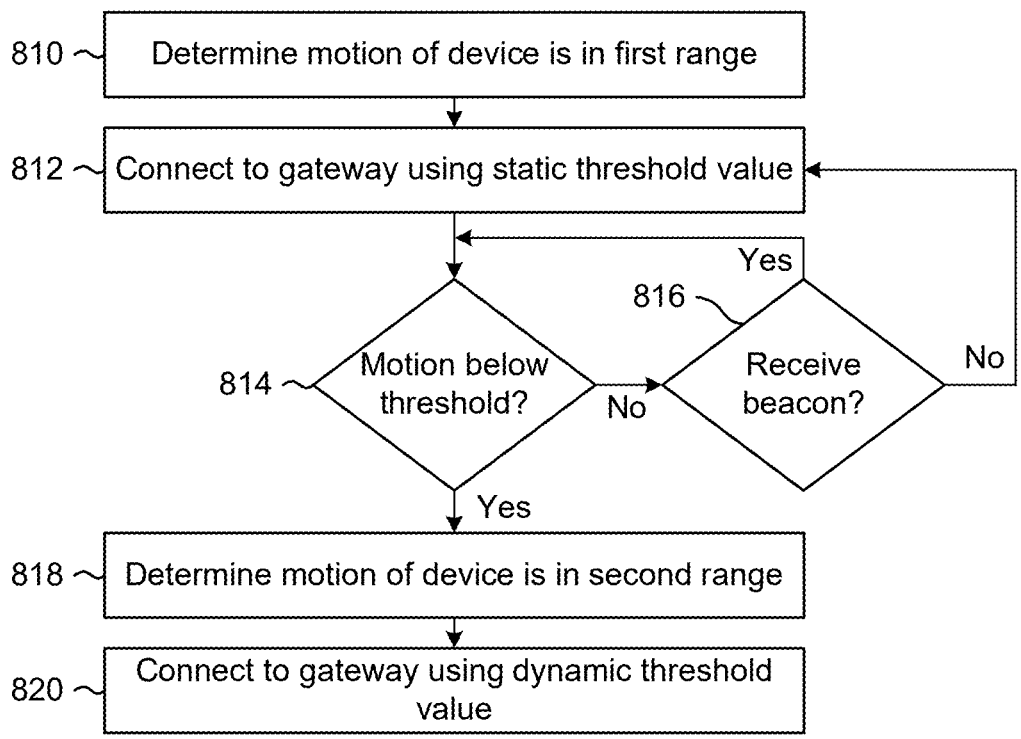
FIGS. 8A-8B are flowcharts conceptually illustrating example methods for switching between a static threshold and a dynamic threshold according to embodiments of the present disclosure.
Figure 8B:
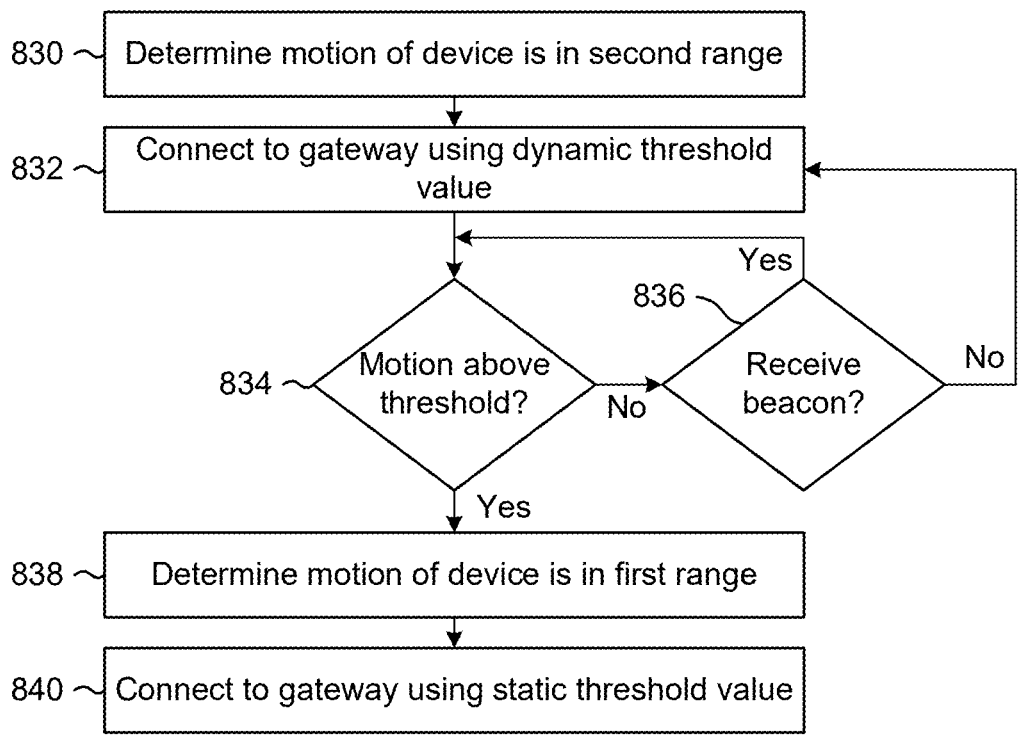

FIGS. 8A-8B are flowcharts conceptually illustrating example methods for switching between a static threshold and a dynamic threshold according to embodiments of the present disclosure. As illustrated in FIG. 8A, in some examples the device 110 may determine (810) that a motion of the device 110 is in a first range (e.g., speed is above the speed threshold value) and may connect (812) to a gateway component 120 using a static threshold value. For example, the device 110 may perform beacon discovery using the static threshold to connect to the gateway component 120.

After connecting to the gateway component 120, the device 110 may determine (814) whether the motion is below a threshold, such as whether a speed associated with the device 110 is below the speed threshold. If the motion is not below the threshold, then the device 110 may determine (816) whether the device 110 has continued to receive a beacon signal from the gateway component 120. For example, the gateway component 120 may send a beacon signal periodically based on a duration of time (e.g., every n seconds) and the device 110 may maintain a connection with the gateway component 120 as long as the beacon signal is received within a period of time (e.g., 3n seconds). In some examples, a channel on which the first gateway component 120a broadcasts the beacon signal may vary and the device 110 may use a channel hopping algorithm to identify the correct channel on which to receive the beacon signals, although the disclosure is not limited thereto. If the device 110 receives the beacon signal within the period of time, the device 110 may loop to step 814 and continue. However, if the device 110 does not receive the beacon signal within the period of time, the device 110 may loop to step 812 and connect to a new gateway component 120.

If the device 110 determines that the motion of the device 110 is below the threshold in step 814, the device 110 may determine (818) that a motion of the device is in a second range (e.g., speed is below the speed threshold value) and may connect (820) to a gateway component 120 using a dynamic threshold value. For example, even though the device 110 may be currently connected to a first gateway component 120, the device 110 may begin beacon discovery using a dynamic threshold and may connect to a second gateway component without departing from the disclosure.

As illustrated in FIG. 8B, in other examples the device 110 may determine (830) that a motion of the device 110 is in the second range (e.g., speed is below the speed threshold value) and may connect (832) to a gateway component 120 using a dynamic threshold value. For example, the device 110 may perform beacon discovery using a dynamic threshold to connect to the gateway component 120.

After connecting to the gateway component 120, the device 110 may determine (834) whether the motion is above a threshold, such as whether a speed associated with the device 110 is above the speed threshold. If the motion is not above the threshold, then the device 110 may determine (836) whether the device 110 has continued to receive a beacon signal from the gateway component 120. For example, the gateway component 120 may send a beacon signal periodically based on a duration of time (e.g., every n seconds) and the device 110 may maintain a connection with the gateway component 120 as long as the beacon signal is received within a period of time (e.g., 3n seconds). As described above, in some examples the device 110 may use a channel hopping algorithm to identify the correct channel on which to receive the beacon signals, although the disclosure is not limited thereto. If the device 110 receives the beacon signal within the period of time, the device 110 may loop to step 834 and continue. However, if the device 110 does not receive the beacon signal within the period of time, the device 110 may loop to step 832 and connect to a new gateway component 120.

If the device 110 determines that the motion of the device 110 is above the threshold in step 834, the device 110 may determine (838) that a motion of the device is in the first range (e.g., speed is above the speed threshold value) and may connect (840) to a gateway component 120 using a static threshold value. For example, the device 110 may simplify the beacon discovery process by connecting to the first gateway component 120 that exceeds the static threshold value.

While the examples illustrated in FIGS. 7-8B refer to the device 110 switching between using a static threshold and a dynamic threshold depending on system conditions (e.g., movement of the device 110), the disclosure is not limited thereto. Instead, the device 110 may switch between first beacon discovery technique(s) and second beacon discovery technique(s) without departing from the disclosure. For example, the first beacon discovery technique(s) may prioritize speed over reliability, while the second beacon discovery technique(s) may prioritize reliability at the expense of speed. Thus, using a static threshold is an example of one of the first beacon discovery techniques, as the static threshold is known prior to beginning beacon discovery and therefore does not add a latency associated with measuring beacon signals and determining a dynamic threshold. However, the disclosure is not limited thereto and the first beacon discovery techniques may also include using a dynamic threshold without departing from the disclosure. Thus, while steps 714, 812, and 840 refer to the device 110 connecting to a gateway component 120 using a static threshold value, the disclosure is not limited thereto and the device 110 may connect to a gateway component 120 using a first beacon discovery technique(s) without departing from the disclosure.

To illustrate an example, the first beacon discovery technique may correspond to determining a first dynamic threshold using first parameters, while the second beacon discovery technique may correspond to determining a second dynamic threshold using second parameters that may be different and/or add more latency than the first parameters. For example, the first parameters may include a first time threshold (e.g., 2 seconds), while the second parameters may include a second time threshold (e.g., 10 seconds), such that determining the first dynamic threshold is significantly faster than determining the second dynamic threshold. Additionally or alternatively, the first parameters may indicate that a first number of beacon signals (e.g., 5-10 beacon signals) are required to determine the first dynamic threshold, such that a duration of time required to determine the first dynamic threshold varies depending on how quickly the device 110 detects the first number of beacon signals. Thus, while the second beacon discovery technique requires a fixed duration of time (e.g., 10 seconds) to determine the second dynamic threshold, the first beacon discovery technique may quickly detect the first number of beacon signals and determine the first dynamic threshold in significantly less time.

Figure 9:
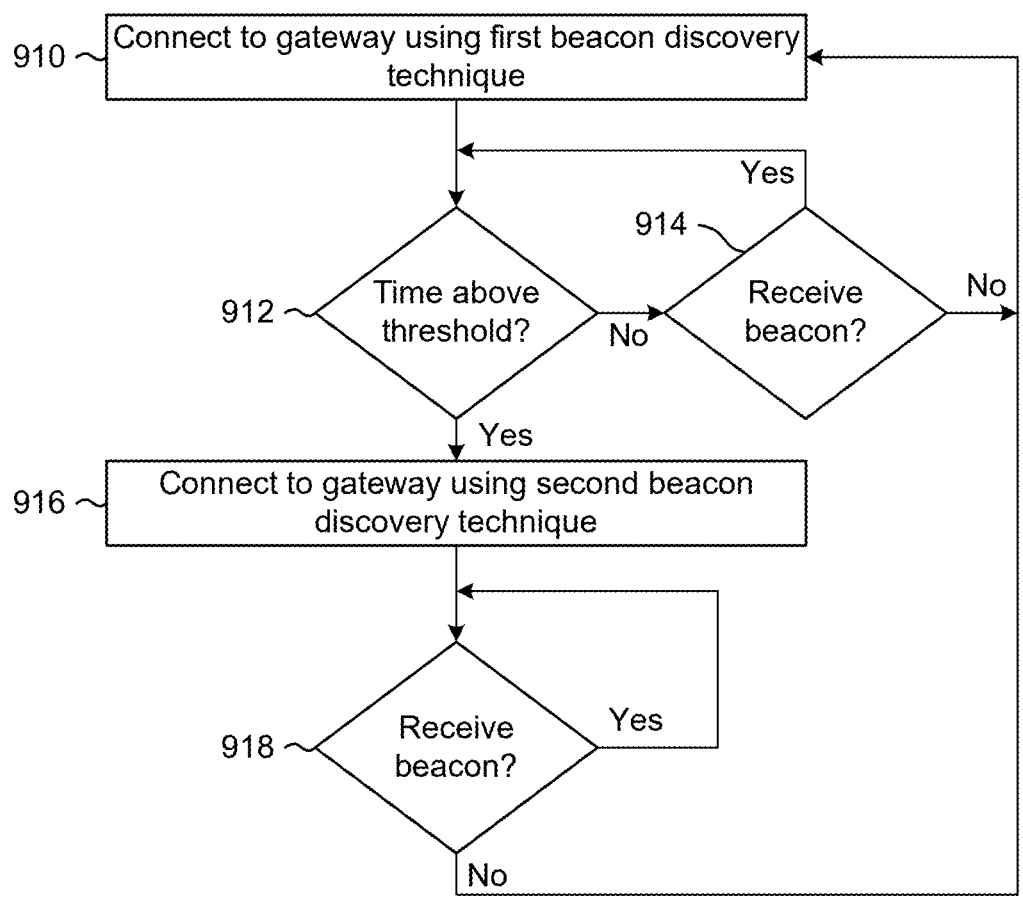
FIG. 9 is a flowchart conceptually illustrating an example method for switching between a first beacon discovery technique and a second beacon discovery technique according to embodiments of the present disclosure.

FIG. 9 is a flowchart conceptually illustrating an example method for switching between a first beacon discovery technique and a second beacon discovery technique according to embodiments of the present disclosure. For example, the device 110 may switch between a first beacon discovery technique that prioritizes speed and a second beacon discovery technique that prioritizes reliability at the expense of adding latency.

When the device 110 detects first system conditions associated with a dynamic environment (e.g., rapid changes in channels and/or gateway components 120), the device 110 may perform beacon discovery using the first beacon discovery technique. Examples of the first system conditions may include detecting movement above a first threshold, being connected to a gateway component 120 for less than a second threshold, determining that a number of beacon signals received from a current gateway component 120 is below a third threshold, and/or the like, although the disclosure is not limited thereto. Thus, the first system conditions indicate that the device 110 should prioritize low latency over reliability, as the device 110 will not be connected to a single gateway component 120 for long.

To improve performance during the first system conditions, the first beacon discovery technique may enable the device 110 to quickly connect to a gateway component 120. Examples of first beacon discovery techniques may include using a static threshold (e.g., global threshold for all devices, fixed threshold depending on type of device, etc.), using a network-assisted threshold (e.g., receiving a fixed threshold from a synchronized gateway component 120 to use during future beacon discovery, extracting a fixed threshold from a beacon signal, etc.), selecting from a plurality of fixed thresholds (e.g., based on network conditions, number of gateway components 120, signal quality metrics, and/or the like), determining a first dynamic threshold using first parameters that prioritize speed, determining the first dynamic threshold based on previously detected beacon signals (e.g., beacon signals that were detected prior to connecting to the most recent gateway component 120, without regard to whether these gateway components 120 are currently in range), and/or the like.

When the device 110 detects second system conditions associated with a static environment (e.g., few changes in channels and/or gateway components 120), the device 110 may perform beacon discovery using the second beacon discovery technique. Examples of the second system conditions may include detecting movement below the first threshold, being connected to a gateway component 120 for more than the second threshold, determining that a number of beacon signals received from a current gateway component 120 is above the third threshold, and/or the like, although the disclosure is not limited thereto. Thus, the second system conditions indicate that the device 110 should prioritize reliability over speed, as the device 110 will remain connected to a single gateway component 120 for a lengthy period of time.

To improve performance during the second system conditions, the second beacon discovery technique may enable the device 110 to identify a gateway component 120 that is in proximity to the device 110 and/or has a reliable connection. For example, the second beacon discovery technique may enable the device 110 to distinguish between gateway components 120 based on a current position of the device 110 and only connect to a subset of optimal gateway component(s) 120. Examples of second beacon discovery techniques may include using a high static threshold (e.g., corresponding to an excellent connection), selecting from a plurality of fixed thresholds (e.g., based on network conditions, number of gateway components 120, signal quality metrics, and/or the like), determining a second dynamic threshold using second parameters that prioritize reliability, and/or the like.

In some examples, the device 110 may switch between a first beacon discovery technique that prioritizes speed by using a static threshold and a second beacon discovery technique that prioritizes reliability by determining a second dynamic threshold using second parameters. However, the disclosure is not limited thereto, and in other examples the device 110 may switch between a first beacon discovery technique that prioritizes speed by determining a first dynamic threshold using first parameters and the second beacon discovery technique that prioritizes reliability by determining the second dynamic threshold using the second parameters without departing from the disclosure.

As illustrated in FIG. 9, the device 110 may connect (910) to a gateway component 120 using a first beacon discovery technique, as described in greater detail above. For example, the device 110 may perform beacon discovery using a static threshold value to connect to a first gateway component 120a. However, the disclosure is not limited thereto, and in other examples the device 110 may perform beacon discovery using the first parameters to determine a first dynamic threshold value and may connect to the first gateway component 120a because a signal strength of a beacon signal received from the first gateway component 120a satisfies the first dynamic threshold value.

After connecting to the first gateway component 120a, the device 110 may determine (912) whether an amount of time the device 110 has been connected to the first gateway component 120a is above a time threshold. If the amount of time is below the time threshold, the device 110 may determine (914) whether the device 110 has continued to receive a beacon signal from the first gateway component 120a. For example, the first gateway component 120a may send a beacon signal periodically based on a duration of time (e.g., every n seconds) and the device 110 may maintain a connection with the first gateway component 120a as long as the beacon signal is received within a period of time (e.g., 3n seconds). In some examples, a channel on which the first gateway component 120a broadcasts the beacon signal may vary and the device 110 may use a channel hopping algorithm to identify the correct channel on which to receive the beacon signals, although the disclosure is not limited thereto. If the device 110 receives the beacon signal within the period of time, the device 110 may loop to step 912 and continue. However, if the device 110 does not receive the beacon signal within the period of time, the device 110 may loop to step 910 and connect to a new gateway component 120.

If the device 110 determines that the amount of time that the device 110 has been connected to the first gateway component 120a is above the time threshold in step 912, the device 110 may connect (916) to a gateway component 120 using a second beacon discovery technique, as described in greater detail above. For example, even though the device 110 may be currently connected to the first gateway component 120a, the device 110 may begin beacon discovery using second parameters and determine a second dynamic threshold value in order to connect to a second gateway component 120b without departing from the disclosure. Thus, the device 110 may use the amount of time that the device 110 is connected to the first gateway component 120a as an indicator that the device 110 is not in motion and may prioritize reliability over speed.

After connecting to the second gateway component 120b, the device 110 may determine (918) whether the device 110 has continued to receive a beacon signal from the second gateway component 120b. As described above, in some examples the device 110 may use a channel hopping algorithm to identify the correct channel on which to receive the beacon signals, although the disclosure is not limited thereto. If the device 110 receives the beacon signal within the period of time, the device 110 may loop to step 918 and maintain the connection with the second gateway component 120b. However, if the device 110 does not receive the beacon signal within the period of time, the device 110 may loop to step 910 and connect to a new gateway component 120 using the static threshold value.

Figure 10:
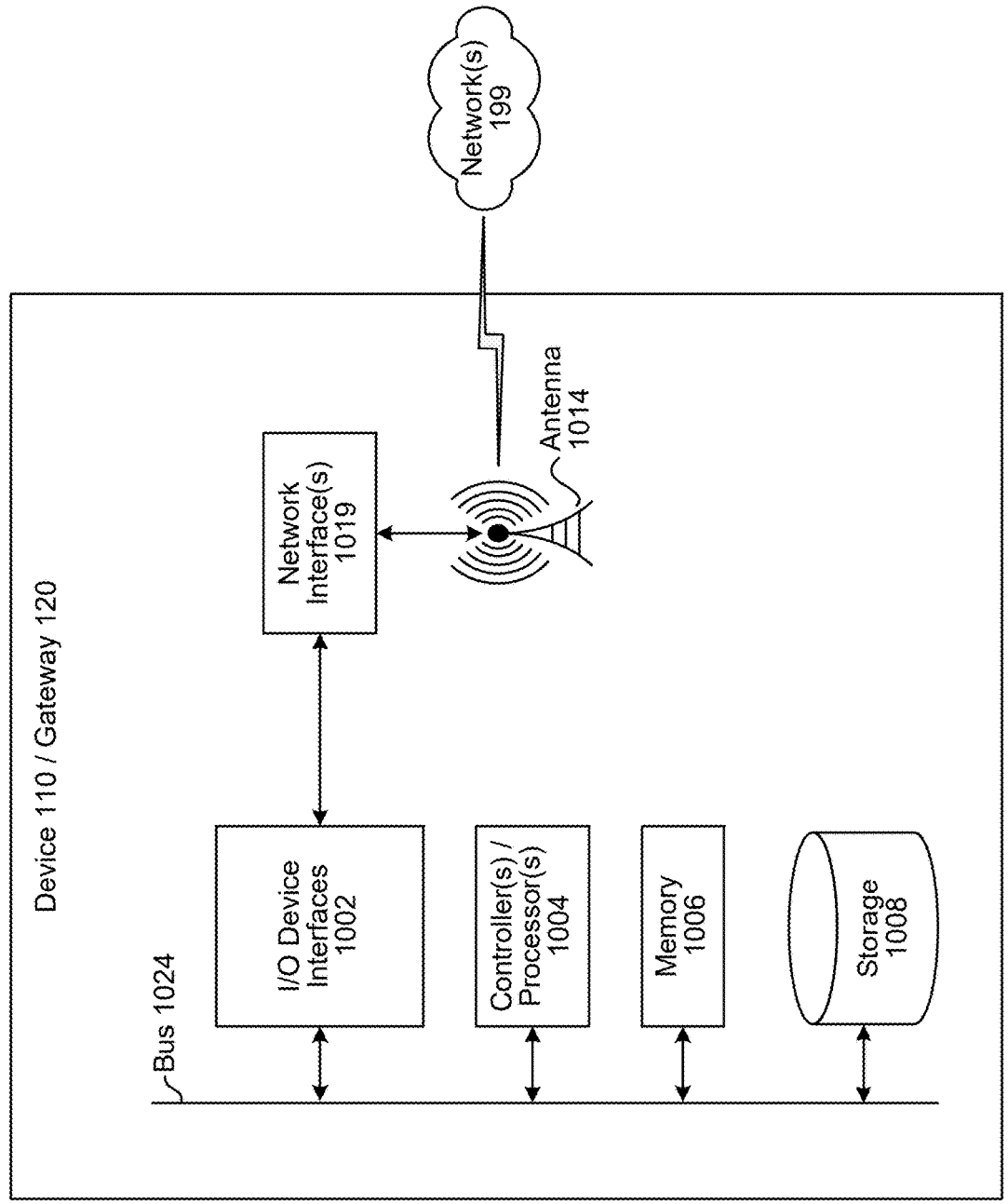
FIG. 10 is a block diagram conceptually illustrating example components of a system for performing beam cancellation according to embodiments of the present disclosure.

FIG. 10 is a block diagram conceptually illustrating a device 110 and/or gateway component 120 that may be used with the system. For ease of illustration, the following description will refer to the device 110 and the gateway component 120 collectively as device 110/120. In operation, the system 100 may include computer-readable and computer-executable instructions that reside on the device (110/120), as will be discussed further below. The components illustrated here are provided by way of illustration and not necessarily as a limitation. For example, the device (110/120) may utilize a subset of particular network interface(s) 1019 or input/output components depicted here, or may utilize components not pictured.

The device (110/120) may include one or more controllers/processors (1004), which may each include a central processing unit (CPU) for processing data and computer-readable instructions, and a memory (1006) for storing data and instructions of the respective device. The memory (1006) may individually include volatile random access memory (RAM), non-volatile read only memory (ROM), non-volatile magnetoresistive memory (MRAM), and/or other types of memory. The device (110/120) may also include a data storage component (1008) for storing data and controller/processor-executable instructions. Each data storage component (1008) may individually include one or more non-volatile storage types such as magnetic storage, optical storage, solid-state storage, etc. The device (110/120) may also be connected to removable or external non-volatile memory and/or storage (such as a removable memory card, memory key drive, networked storage, etc.) through respective input/output device interfaces (1002).

Computer instructions for operating the device (110/120) and its various components may be executed by the respective device's controller(s)/processor(s) (1004), using the memory (1006) as temporary "working" storage at runtime.

A device's computer instructions may be stored in a non-transitory manner in non-volatile memory (1006), data storage component (1008), or an external device(s). Alternatively, some or all of the executable instructions may be embedded in hardware or firmware on the respective device in addition to or instead of software.

Additionally, the device (110/120) may include an address/data bus (1024) for conveying data among components of the respective device. Each component within a device (110/120) may also be directly connected to other components in addition to (or instead of) being connected to other components across the bus (1024).

The device (110/120) includes input/output device interfaces (1002). A variety of components may be connected through the input/output device interfaces (1002), such as network interface(s) 1019, microphones (not illustrated), loudspeaker(s) (not illustrated), a display (not illustrated), and/or the like. The input/output interfaces (1002) may include A/D converters for converting output of microphones into microphone audio data, if the microphones are integrated with or hardwired directly to the device (110/120). If the microphones are independent, the A/D converters will be included with the microphones, and may be clocked independent of the clocking of the device (110/120). Likewise, the input/output interfaces 1002 may include D/A converters for converting output audio data into an analog current to drive the loudspeaker(s), if the loudspeaker(s) are integrated with or hardwired to the device (110/120). However, if the loudspeaker(s) are independent, the D/A converters will be included with the loudspeaker(s) and may be clocked independent of the clocking of the device (110/120) (e.g., conventional Bluetooth® loudspeakers).

The I/O interface(s) 1002 may be configured to provide communications between the device (110/120) and other devices via the network(s) 199. For example, the I/O interface(s) 1002 may provide communications between the device (110/120) and other devices 110, gateway component(s) 120, docking stations, routers, access points, and so forth, for example through antenna 1014 and/or other components. The antenna 1014 can receive and transmit RF signals. For example, the antenna 1014 may be configured to convert electromagnetic waves into electrical signals or vice versa.

In some examples, the device 110 may include a dual-band RF transceiver configured to exchange data or connect to the Internet using radio waves in two WLAN bands (2.4 GHz band, 5 GHz band) via one or multiple antennas 1014. For example, a dual-band WLAN RF transceiver may include a 5 GHz WLAN channel and a 2.4 GHz WLAN channel. Additionally or alternatively, the device 110 may include additional transceivers that operate in sub-GHz, 2.45 GHz, 5 GHz, and/or the like, although the disclosure is not limited thereto.

The network interface(s) 1019 may include one or more of a wireless area network (WAN) interface (e.g., cellular radio), a wireless local area network (WLAN) interface (e.g., radio using Wi-Fi® protocols), a personal area network (PAN) interface (e.g., radio using Bluetooth® protocols), secondary radio frequency (RF) link interface (e.g., a sub-GHz radio), and/or other interfaces. The WLAN interface may be compliant with at least a portion of the Wi-Fi® specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth®, wireless USB, Z-Wave®, ZigBee®, or other standards. For example, the PAN interface may be compliant with the Bluetooth Low Energy (BLE) specification. Thus, the network interface(s) 1019 may include components compatible with Ethernet, Wi-Fi®, Bluetooth®, Bluetooth Low Energy, ZigBee®, and so forth, although the disclosure is not limited thereto.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. In some examples, the secondary RF link interface may be utilized to provide backup communication between the device (110/120) and other devices in the event that communication fails using one or more of the WAN interface, the WLAN interface, and/or the PAN interface. For example, in the event the device (110/120) travels to an area within the environment 20 that does not have Wi-Fi® coverage, the device (110/120) may use the secondary RF link interface to communicate with another device such as a gateway component 120, a specialized access point, docking station, and/or other device (110/120). The disclosure is not limited thereto, however, and in other examples the secondary RF link interface may be utilized to provide communication while minimizing power consumption without departing from the disclosure. For example, the device 110 may be a low power device capable of entering a low power mode to reduce power consumption, and the device 110 may be configured to connect primarily using the secondary RF link interface. Additionally or alternatively, the device 110 may only include the secondary RF link interface without departing from the disclosure, such that the device 110 may not include the WLAN interface and/or the PAN interface.

The WLAN interface may create a wireless connection using a first frequency range (e.g., 2.4 GHz radio) and/or a second frequency range (e.g., 5 GHz radio). The PAN interface may create a wireless connection using the first frequency range. The WAN interface may create a cellular connection between the device (110/120) and a device in a cellular network (not illustrated). In some examples, more than one 2.4 GHz radio may be used for more wireless connections. Additionally or alternatively, a different number of 5 GHz radios may be used for more or less wireless connections with other nodes.

The secondary RF link interface may operate in a sub-gigahertz frequency range. For example, a sub-gigahertz radio operates in the ISM spectrum bands below 1 GHz, such as in the 769-935 MHz, 315 MHz, and the 468 MHz frequency range. The sub-gigahertz radio can be similar to radios used in Internet of Things (IoT) applications. The secondary RF link interface (e.g., sub-GHz radio) may create a wireless connection and may be a low-power, long-range radio, such as a low-power, long-range wide area network (LPWAN) radio, although the disclosure is not limited thereto.

In some examples, the secondary RF link interface may use one or more modulation schemes, such as a frequency shift keying (FSK) modulation scheme, a Chirp Spread Spectrum (CSS) modulation scheme such as LoRa® (Long Range), an Orthogonal Frequency Division Multiplexing (OFDM) modulation scheme, and/or the like. Thus, the secondary RF link interface can include multi-modulation scheme logic that may include processing logic that comprises hardware (e.g., circuitry, dedicated logic, programmable logic, microcode, etc.), software, firmware, or a combination thereof.

The secondary RF link interface (e.g., sub-GHz radio) can operate according to one or more sub-GHz wireless protocols and/or modulation techniques. Sub-GHz wireless protocols refer to wireless communication protocols that operate in frequency bands below 1 GHz. For example, the frequency range can be from a few hundred kilohertz (kHz) to several hundred megahertz (MHz) (e.g., 169 MHz, 433 MHz, 868 MHz, and 915 MHz). Some popular sub-GHz wireless protocols include FSK modulation, LoRa® (Long Range), Sigfox, Wireless M-Bus, or the like. LoRa® is a low-power wide-area network (LPWAN) protocol that enables long-range communication with low power consumption. LoRaWAN operates in the unlicensed sub-GHz bands and is commonly used in applications like smart cities, asset tracking, and agriculture. Sigfox is another LPWAN protocol that utilizes ultra-narrowband technology to achieve long-range communication with low power requirements. Sigfox operates in the unlicensed sub-GHz bands and is often used for Internet of Things (IoT) applications. Wireless M-Bus is a protocol designed initially for metering applications such as electricity, gas, and water meters. It operates in various sub-GHz frequency bands and provides reliable and energy-efficient data transmission for utility metering. These sub-GHz protocols enable a wide range of applications requiring long-range connectivity, extended battery life, and reliable communication in challenging environments.

The sub-GHz wireless protocols described above may use different modulation schemes. So, to support multiple modulation schemes, the secondary RF link interface may include multiple modulation modules without departing from the disclosure. For example, LoRa® utilizes a modulation scheme called Chirp Spread Spectrum (CSS). CSS spreads the signal across a wide bandwidth by varying the frequency linearly over time. This modulation technique provides excellent sensitivity, allowing LoRa® devices to detect and decode weak signals even in noisy environments. LoRa® operates in the license-free sub-GHz frequency bands, such as 868 MHz (Europe), 915 MHz (North America), and 433 MHz (Asia). These frequency bands enable long-range communication and better penetration through obstacles than higher frequency bands. For another example, Orthogonal Frequency Division Multiplexing with Long Range (OFDM-LR) uses OFDM modulation schemes, and Wireless Smart Utility Networks (WiSun) uses a variant of OFDM known as Multi-Carrier Modulation (MCM). OFDM is a multi-carrier modulation technique that divides the available bandwidth into multiple narrowband subcarriers, each carrying a portion of the data. OFDM-LR is a new long range extension of the 802.15.4-2020 OFDM specification. The extension can be used for increased link budget and reliability while remaining compliant with existing regulatory regulations worldwide. MCM divides the available bandwidth into multiple subcarriers and transmits data symbols using various modulation schemes, such as Binary Phase Shift Keying (BPSK) or Quadrature Amplitude Modulation (QAM). Some sub-GHz wireless protocols use a frequency shift keying (FSK) modulation scheme.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1002/1102) may also include and/or communicate with communication components (such as the network interface(s) 1019) that allow data to be exchanged between devices such as different physical servers in a collection of servers or other components. The input/output device interfaces (1002) may also include an interface for an external peripheral device connection such as universal serial bus (USB), FireWire, Thunderbolt or other connection protocol without departing from the disclosure.

The device (110/120) may connect to one or more network(s) 199 through either wired and/or wireless connections. For example, the device (110/120) may connect to the network(s) 199 via an Ethernet port, through a wireless service provider (e.g., using a Wi-Fi® or cellular network connection), over a wireless local area network (WLAN) (e.g., using Wi-Fi® or the like), over a wired connection such as a local area network (LAN), over a wireless connection using a sub-GHz frequency band, and/or the like. The network(s) 199 may include a local or private network or may include a wide network such as the Internet.

As illustrated in FIG. 10, the input/output device interfaces 1002 may connect to the network(s) 199 via the antenna(s) 1014. For example, the device (110/120) may connect to the network(s) 199 via a sub-GHz radio, a wireless local area network (WLAN) (such as Wi-Fi®) radio, Bluetooth®, and/or wireless network radio, such as a radio capable of communication with a wireless communication network such as a Long Term Evolution (LTE) network, WiMAX® network, 3G network, 4G network, 5G network, etc. A wired connection such as Ethernet may also be supported. Through the network(s) 199, the system may be distributed across a networked environment. The I/O device interface (1002) may also include communication components that allow data to be exchanged between devices such as different physical servers in a collection of servers or other components.

The components of the device (110/120) may include their own dedicated processors, memory, and/or storage. Alternatively, one or more of the components of the device (110/120) may utilize the I/O interfaces (1002), processor(s) (1004), memory (1006), and/or data storage component (1008) of the device (110/120), respectively. Thus, a first component may have its own I/O interface(s), processor(s), memory, and/or storage; a second component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device (110/120), as described herein, are illustrative, and may be located as a stand-alone device or may be included, in whole or in part, as a component of a larger device or system.

As illustrated in FIG. 11, multiple devices (110a-110g) and shared resources 125 may contain components of the system and the devices may be connected over a network(s) 199. The network(s) 199 may include a local or private network or may include a wide network such as the Internet. Other devices may be included as network-connected support devices, such as the shared resources 125 and/or other devices (not illustrated). The shared resources 125 may connect to the network(s) 199 through a wired connection or wireless connection.

The devices (110/120) may be connected to the network(s) 199 through either wired or wireless connections. As illustrated in FIG. 11, a tablet computer 110*a*, a smart phone 110*b*, a smart watch 110*c*, speech-detection device(s) with a display 110*d*, speech-detection device(s) 110*e*, input/output (I/O) limited device(s) 110*f*, tracking device(s) 110*g* (e.g., pet tracker, vehicle tracker) or sensors (e.g., security sensors, motion detectors, natural gas detectors, etc.), and/or gateway component(s) 120 may be connected to the network(s) 199 through a wired and/or wireless connection. For example, the devices (110/120) may be connected to the network(s) 199 via an Ethernet port, through a wireless service provider (e.g., using a Wi-Fi® or cellular network connection), over a wireless local area network (WLAN) (e.g., using Wi-Fi® or the like), over a wired connection such as a local area network (LAN), and/or the like.

While not illustrated in FIG. 11, in some examples the devices 110 may be connected to the network(s) 199 through wireless connections enabled by the gateway components 120, as described in greater detail above. For example, the gateway components 120 may route data to and from the device 110 while acting as a passthrough node.

Additionally or alternatively, while FIG. 11 illustrates the gateway components 120 separately from the devices 110, the disclosure is not limited thereto and in some examples a device 110 may also act as a gateway component 120. For example, the speech-detection device(s) with a display 110*d* and/or the speech-detection device(s) 110*e* may establish a direct link to the network(s) 199 while acting as a gateway component 120 for other devices 110 without departing from the disclosure. However, the disclosure is not limited thereto and any of the devices 110 may correspond to a gateway component 120 and/or may connect to the network(s) via a gateway component 120 without departing from the disclosure.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by a first device, a first radio frequency signal associated with a first channel;
   determining a first signal strength value associated with the first radio frequency signal;
   receiving a second radio frequency signal associated with a second channel;
   determining a second signal strength value associated with the second radio frequency signal;
   determining that a first duration of time has elapsed;
   based at least in part on determining that the first duration of time has elapsed, determining, using the first signal strength value and the second signal strength value, a first threshold value;
   receiving a third radio frequency signal associated with a third channel;
   determining that a third signal strength value associated with the third radio frequency signal exceeds the first threshold value; and
   based on the determining that the third signal strength value exceeds the first threshold value, synchronizing, by the first device using the third channel, timing information with a second device.

2. The computer-implemented method of claim 1, further comprising:
   determining, using the first signal strength value, a first value;
   incrementing a counter to a first counter value;
   determining a second value by adding the second signal strength value to the first value; and
   incrementing the counter to a second counter value, wherein the first threshold value is determined using the second value and the second counter value.

3. The computer-implemented method of claim 1, further comprising:
   storing the first signal strength value as a first entry in distribution data;
   storing the second signal strength value as a second entry in the distribution data; and
   determining a number of entries represented in the distribution data, wherein the first threshold value is determined using the distribution data and the number of entries.

4. The computer-implemented method of claim 1, further comprising:
   determining that the first device failed to receive a broadcast from the second device;
   beginning beacon discovery during a first time range;
   receiving, during a second time range, a fourth radio frequency signal associated with the first channel;
   determining that a second duration of time between the first time range and the second time range is less than the first duration of time;
   determining that a fourth signal strength value associated with the fourth radio frequency signal exceeds a static threshold value; and
   synchronizing, by the first device using the first channel, timing information with a third device.

5. The computer-implemented method of claim 1, further comprising:
   determining that the first device failed to receive a broadcast from the second device;
   determining that a speed associated with the first device satisfies a condition;
   receiving a fourth radio frequency signal associated with the first channel;
   determining a fourth signal strength value associated with the fourth radio frequency signal;
   receiving a fifth radio frequency signal associated with the second channel;
   determining a fifth signal strength value associated with the fifth radio frequency signal;
   determining that the first duration of time has elapsed; and
   based at least in part on determining that the first duration of time has elapsed, determining, using the fourth signal strength value and the fifth signal strength value, a second threshold value.

6. The computer-implemented method of claim 1, further comprising:
   determining that the first device failed to receive a broadcast from the second device;
   determining that a speed associated with the first device does not satisfy a condition;
   receiving a fourth radio frequency signal associated with the first channel;
   determining that a fourth signal strength value associated with the fourth radio frequency signal exceeds a static threshold value; and
   synchronizing, by the first device using the first channel, timing information with a third device.

7. The computer-implemented method of claim 1, further comprising:
   determining that a speed associated with the first device satisfies a condition;
   beginning beacon discovery using a static threshold value;
   receiving a fourth radio frequency signal associated with the first channel;
   determining that a fourth signal strength value associated with the fourth radio frequency signal exceeds the static threshold value; and
   synchronizing, by the first device using the first channel, timing information with a third device.

8. The computer-implemented method of claim 1, further comprising, prior to receiving the first radio frequency signal:
   beginning first beacon discovery using a static threshold value;
   receiving a fourth radio frequency signal associated with the first channel;
   determining that a fourth signal strength value associated with the fourth radio frequency signal exceeds the static threshold value;
   synchronizing, during a first time range and by the first device using the first channel, timing information with a third device;
   determining that a second duration of time has elapsed after the first time range; and
   based at least in part on determining that the second duration of time has elapsed, beginning, during a second time range, second beacon discovery, wherein the second time range is used to determine that the first duration of time has elapsed.

9. The computer-implemented method of claim 1, wherein the first channel is in a sub-GHz frequency band and the first radio frequency signal is associated with a frequency shift keying (FSK) modulation scheme.

10. The computer-implemented method of claim 1, further comprising:
    receiving, by the first device from the second device, a static threshold value;
    determining that the first device failed to receive a broadcast from the second device;
    receiving a fourth radio frequency signal associated with the first channel;
    determining that a fourth signal strength value associated with the fourth radio frequency signal exceeds the static threshold value; and
    synchronizing, by the first device using the first channel, timing information with a third device.

11. An electronic device comprising:
    at least one processor; and
    memory including instructions operable to be executed by the at least one processor to cause the electronic device to:
      begin first beacon discovery using a first threshold value;
      based on receiving a first radio frequency signal associated with a first channel, determine that a first signal strength value associated with the first radio frequency signal exceeds the first threshold value;
      synchronize, during a first time range using the first channel, timing information with a second device;
      determine that a first condition is satisfied;

based at least in part on determining that the first condition is satisfied, begin, during a second time range, second beacon discovery;

based on receiving a second radio frequency signal associated with a second channel, determine a second signal strength value associated with the second radio frequency signal;

based on receiving a third radio frequency signal associated with a third channel determine a third signal strength value associated with the third radio frequency signal;

determine that a first duration of time has elapsed since the second time range;

based at least in part on determining that the first duration of time has elapsed, determine, using the second signal strength value and the third signal strength value, a second threshold value;

based on receiving a fourth radio frequency signal associated with a fourth channel determine that a fourth signal strength value associated with the fourth radio frequency signal exceeds the second threshold value; and based on determining that the fourth signal strength value exceeds the second threshold value, synchronize, using the fourth channel, timing information with a third device.

12. The electronic device of claim 11, wherein the memory further comprises instructions that, when executed by the at least one processor, further cause the electronic device to:

determine, using the second signal strength value, a first value;

increment a counter to a first counter value;

determine a second value by adding the third signal strength value to the first value; and increment the counter to a second counter value, wherein the second threshold value is determined using the second value and the second counter value.

13. The electronic device of claim 11, wherein the memory further comprises instructions that, when executed by the at least one processor, further cause the electronic device to:

store the second signal strength value as a first entry in distribution data;

store the third signal strength value as a second entry in the distribution data; and determine a number of entries represented in the distribution data, wherein the second threshold value is determined using the distribution data and the number of entries.

14. The electronic device of claim 11, wherein the memory further comprises instructions that, when executed by the at least one processor, further cause the electronic device to:

determine that the electronic device failed to receive a broadcast from the third device;

begin third beacon discovery during a third time range;

receive, during a fourth time range, a fifth radio frequency signal associated with the third channel;

determine that a second duration of time between the third time range and the fourth time range is less than the first duration of time;

determine that a fifth signal strength value associated with the fifth radio frequency signal exceeds a static threshold value; and synchronize, using the third channel, timing information with a fourth device.

15. The electronic device of claim 11, wherein the memory further comprises instructions that, when executed by the at least one processor, further cause the electronic device to:

determine that the electronic device failed to receive a broadcast from the third device;

determine, during a third time range, that a speed associated with the electronic device satisfies the first condition;

receive a fifth radio frequency signal associated with the second channel;

determine a fifth signal strength value associated with the fifth radio frequency signal;

receive a sixth radio frequency signal associated with the third channel;

determine a sixth signal strength value associated with the sixth radio frequency signal;

determine that the first duration of time has elapsed since the third time range; and based at least in part on determining that the first duration of time has elapsed, determine, using the fifth signal strength value and the sixth signal strength value, a third threshold value.

16. The electronic device of claim 11, wherein the memory further comprises instructions that, when executed by the at least one processor, further cause the electronic device to:

determine that the electronic device failed to receive a broadcast from the third device;

determine that a speed associated with the electronic device does not satisfy the first condition;

receive a fifth radio frequency signal associated with the third channel;

determine that a fifth signal strength value associated with the fifth radio frequency signal exceeds the first threshold value; and synchronize, by the electronic device using the third channel, timing information with a fourth device.

17. The electronic device of claim 11, wherein the memory further comprises instructions that, when executed by the at least one processor, further cause the electronic device to:

determine that a speed associated with the electronic device does not satisfy the first condition;

begin third beacon discovery using the first threshold value;

receive a fifth radio frequency signal associated with the third channel;

determine that a fifth signal strength value associated with the fifth radio frequency signal exceeds the first threshold value; and synchronize, by the electronic device using the third channel, timing information with a fourth device.

18. The electronic device of claim 11, wherein the first channel is in a sub-GHz frequency band and the first radio frequency signal is associated with a frequency shift keying (FSK) modulation scheme.

19. The electronic device of claim 11, wherein the memory further comprises instructions that, when executed by the at least one processor, further cause the electronic device to:

receive, by the electronic device from the third device, a third threshold value;

determine that the electronic device failed to receive a broadcast from the third device;

receive a fifth radio frequency signal associated with the third channel;

determine that a fifth signal strength value associated with the fifth radio frequency signal exceeds the third threshold value; and synchronize, using the third channel, timing information with a fourth device.

20. The electronic device of claim 11, wherein the memory further comprises instructions that, when executed by the at least one processor, further cause the electronic device to:

determine that the first condition is satisfied by determining that a second duration of time has elapsed since the first time range.

21. An electronic device comprising:

a wireless radio;

one or more processors; and one or more non-transitory electronically readable media storing processor executable instructions which, when executed using the one or more processors, cause the electronic device to perform operations comprising:

based on receiving a first radio frequency signal associated with a first channel, determining a first signal strength value associated with the first radio frequency signal;

based on receiving a second radio frequency signal associated with a second channel, determining a second signal strength value associated with the second radio frequency signal;

determining that a first duration of time has elapsed;

based at least in part on determining that the first duration of time has elapsed, determining, using the first signal strength value and the second signal strength value, a first threshold value;

based on receiving a third radio frequency signal associated with a third channel, comparing a third signal strength value associated with the third radio frequency signal to the first threshold value; and based on the comparing of the third signal strength value to the first threshold value, synchronizing, by the electronic device using the third channel, timing information with a second device.

22. The electronic device of claim 21, wherein the one or more non-transitory electronically readable media further store processor executable instructions which, when executed using the one or more processors, cause the electronic device to perform operations comprising:

determining, using the first signal strength value, a first value;

incrementing a counter to a first counter value;

determining a second value by adding the second signal strength value to the first value; and incrementing the counter to a second counter value, wherein the first threshold value is determined using the second value and the second counter value.

23. The electronic device of claim 21, wherein the one or more non-transitory electronically readable media further store processor executable instructions which, when executed using the one or more processors, cause the electronic device to perform operations comprising:

storing the first signal strength value as a first entry in distribution data;

storing the second signal strength value as a second entry in the distribution data; and determining a number of entries represented in the distribution data, wherein the first threshold value is determined using the distribution data and the number of entries.

* * * * *